INVENTOR
DAVEY L. MALABY
BY Richard H. Smith
ATTORNEY

April 14, 1970 D. L. MALABY 3,506,807

SCAN CENTERING DEVICE

Filed Nov. 24, 1965 12 Sheets-Sheet 3

April 14, 1970 D. L. MALABY 3,506,807

SCAN CENTERING DEVICE

Filed Nov. 24, 1965 12 Sheets-Sheet 7

THRESHOLD COUNTER

April 14, 1970 D. L. MALABY 3,506,807

SCAN CENTERING DEVICE

Filed Nov. 24, 1965 12 Sheets-Sheet 12

VERTICAL DEFLECTION CONTROL

United States Patent Office 3,506,807
Patented Apr. 14, 1970

3,506,807

SCAN CENTERING DEVICE

Davey L. Malaby, Rochester, Minn., assignor to International Business Machines Corporation, Armonk, N.Y., a corporation of New York Filed Nov. 24, 1965, Ser. No. 509,512
Int. Cl. G06k 7/015, 9/04
U.S. Cl. 235—61.11 27 Claims

ABSTRACT OF THE DISCLOSURE

Apparatus is provided for centering the field of scan of a flying spot scanner on a line of characters to be read. Logic circuits are responsive to digitized video data to develop feedback signals to the vertical and horizontal deflection control circuits for the scanner to control both the vertical field of scan and the amount of horizontal raster displacement for initial line location, for line following and for character recognition. Different logical criteria is used in each of the three modes to obtain an optimum performance. Bit weighting is used for dampening the response of the system.

This invention relates to scan centering and, more particularly, to a device for controlling the scanner of a character reading machine so as to center its field of scan on a line of characters to be read and to maintain said field on center as the line is scanned.

A number of scan centering schemes are disclosed in the prior art. Perhaps the simplest of these is the so-called "dead reckoning" technique. This technique requires that the scanner have a fixed field of scan and that the document positioning means operate to position each new line of characters within this field. Naturally, this calls for a highly accurate document positioning device but, even more critically, it requires a fixed, or at least a highly controlled, document format. Lines of characters must be in the same relative position on each document and the degree of line skew and character alignment must not depart from rigid tolerances on any document. It is readily apparent that this scan centering scheme is completely unsuited for "universal" character recognition machines (machines capable of reading a wide variety of document formats, character fonts, etc.) since the requirement for rigid format control is incompatible with the basic objectives sought in such machines.

This therefore demonstrates the need in a universal character recognition machine for means adapted to control the scanner to adjust the field of scan to suit each individual line of characters to be read. Such means must therefore enable the scanner to search for and find each new line to be read (preferably without any intervening document movement), and once the line is located, to cause the field of scan to center upon the line and to remain centered while the line is being read. This must be possible notwithstanding the fact that line location as well as line spacing may vary widely from document to document, and further notwithstanding the fact that the lines may be skewed and the characters within a line out of alignment with one another. Further, the scan centering technique employed must be compatible with high speed character recognition systems.

Of the prior art devices capable of adjusting the field of scan to suit individual documents the one which perhaps most nearly meets these requirements is one which calls for a vertical row of photocells to be moved at a high speed relative to the line of characters to be read. The height of the row of photocells defines the vertical field of scan and, being adequate to fully span the tallest character encountered, is substantially greater than the average character height. As a line of characters moves past the row, it appears as a blur or band of reduced reflectivity such that the photocells directly over the character band "see" black while those photocells positioned on either side of the band "see" white. The outputs from the photocells at either end of the row are balanced in an electrical summing network which is connected in a servo loop to control the vertical position of the scanner such that the scanner seeks a position where the number of photocells seeing white on one side of the character band is equal to the number seeing white on the opposite side. This centers the field of scan on the line.

A major drawback to this system is that it is basically mechanical in nature, calling for mechanical means to create the scanning movement between the photocells and the document as well as to create the adjusting movement to position the field of scan. The inertia of the system is relatively great, preventing it from making the rapid adjustments which may be necessary in high speed character reading. Further, this system does not provide means for dealing with the situation presented when, as the scanner is attempting to center on a new line of characters, two character bands, e.g., the one that has just been read and the next one to be read, simultaneously fall within the view of the photocells. In such a case, the response of the system is substantially arbitrary and the chances of its becoming positioned on the line it has just read are substantially equal to the chances of its becoming positioned on the correct line.

A further disadvantage of this system is that it tends to adjust the vertical field of scan in response to every slight deviation of the character line from a perfectly horizontal band. This is undesirable since some character fonts, indeed most character fonts, do not call for all characters to be of exactly equal height. Thus, some characters such as "3," "5" and "7" have tails which project below the bottoms of the other characters while some characters such as "4" and "6" have tops which project above the tops of most other characters. Since an undue amount of shifting of the scan field tends to cause problems in the recognition circuits, it is desirable to dampen the response of the system such that it tends not to react, or to react at a reduced rate, to normal line unevenness caused by font design, while at the same time remaining sufficiently sensitive to compensate for conditions of abnormal line unevenness caused by skew or character misalignment.

It is therefore an object of the present invention to provide an improved scan centering device that overcomes the deficiencies of the prior art.

Another object is to provide a scan centering device compatible with a character recognition machine employing a high speed scanner, such as a cathode ray tube flying-spot scanner.

A further object is to provide a scan centering device adapted to cause the field of scan to be moved away from a previously read line of characters when that line and a portion of the next line to be read both come within the field of scan.

Still another object is to provide a scan centering device which tends to distinguish between conditions of normal line unevenness due to font design and conditions of line unevenness due to line skew and character misalignment and to be less reactive in adjusting the vertical field of scan in response to the former condition than the latter.

Still a further object is to provide a scan centering device having modes of operation differing in accordance with the type of scanning being performed, e.g., scanning to center on a line, scanning to maintain center on the line or scanning to maintain center on the line while scanning for character recognition.

Yet another object is to provide a scan centering device which, when the scanner is scanning for character recognition, permits readjustments in the vertical field of scan only when said scanner is scanning between characters.

The present invention, in its preferred embodiment, is adapted to operate in conjunction with a character recognition machine employing a cathode ray tube flying-spot scanner. Photomultiplier tubes, picking up light reflected from the document, cause a series of data bits to be generated each time the scanner is driven through a vertical character scan. The value of each data bit is determined by whether the photomultiplier tube sees black or white at the instant the bit is generated. Data bits for each scan are gated into a serial storage device, whereupon they are analyzed by recognition circuitry, not a part of the present invention, to yield a useful character output.

In accordance with the present invention, the serial video data generated by the photomultiplier tube and digitized in amplitude and time is inspected by registration circuit means which provide an output to the scanner to control the position of the vertical field of scan. In one aspect of the invention, the registration circuit looks for the presence of significant data bits in an upper and a lower portion of each vertical scan and compares the relative amounts of said data contained in each of the portions. In accordance with the results of this comparison, negative feedback signals are transmitted to the scanner to adjust the position of the vertical scan field. Means are provided for giving data located in those segments of the upper and lower scan portions which are nearest the center of the scan a greater weight in the determination of the comparison so the response of the system to conditions of normal line unevenness is effectively dampened.

In a second aspect of the invention, the registration means inspects the incoming video signals to determine the presence of significant data bits in an upper, center and lower portion of each scan, whereby, in accordance with predetermined logic conditions, additional scan control feedback signals are generated. Still further feedback signals are generated by logically combining the results of the above-mentioned comparison operation with the output generated from inspection of these upper, center and lower scan portions. Among these latter feedback signals is one which is adapted to alter the logical criteria employed in generating the other feedback signals as well as to alter the scanning density with which the scanner operates.

The invention thus provides a highly versatile scan centering device for a high speed character recognition machine, which device provides a heretofore unavailable degree of scan field position control, resulting in a character recognition machine which is adapted to read less controlled document formats.

The foregoing and other objects, features and advantages of the invention will be apparent from the following more particular description of a preferred embodiment of the invention, as illustrated in the accompanying drawings.

Figure 4A:
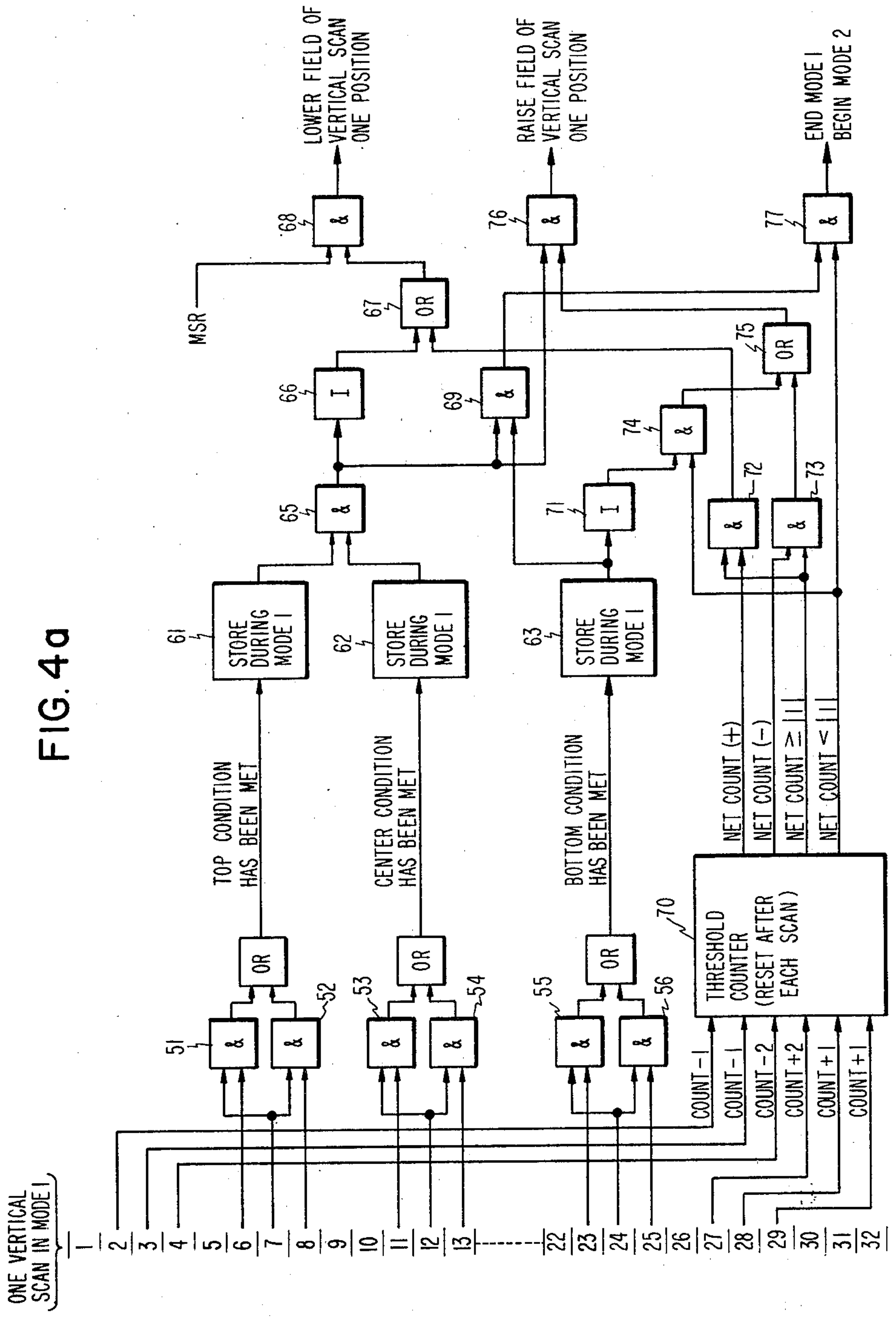
Figures 4B, 4C:
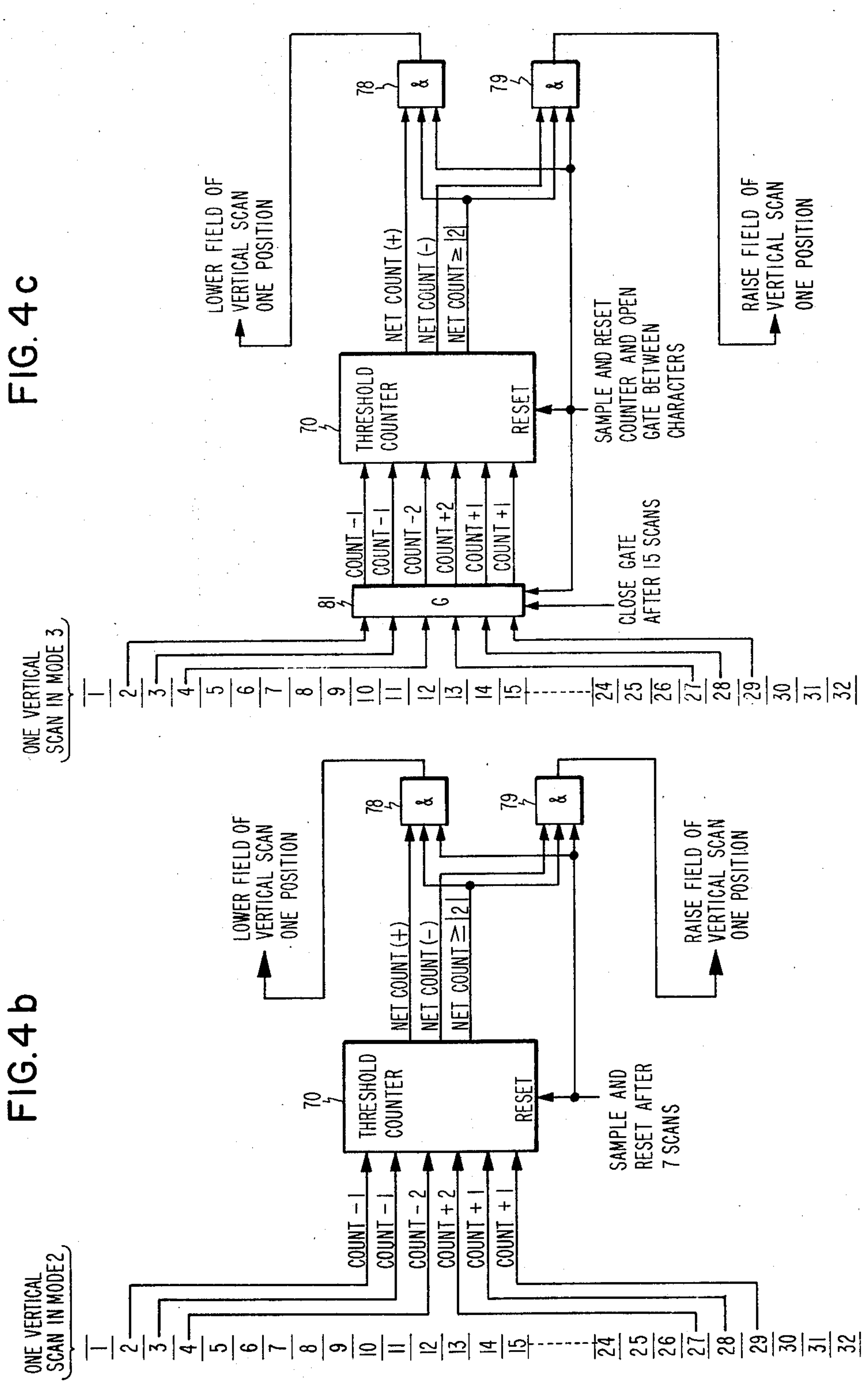

FIGS. 4*a*, 4*b* and 4*c* are schematic logic diagrams showing the various logical functions performed in the different modes of operation of the invention.

Figure 5:
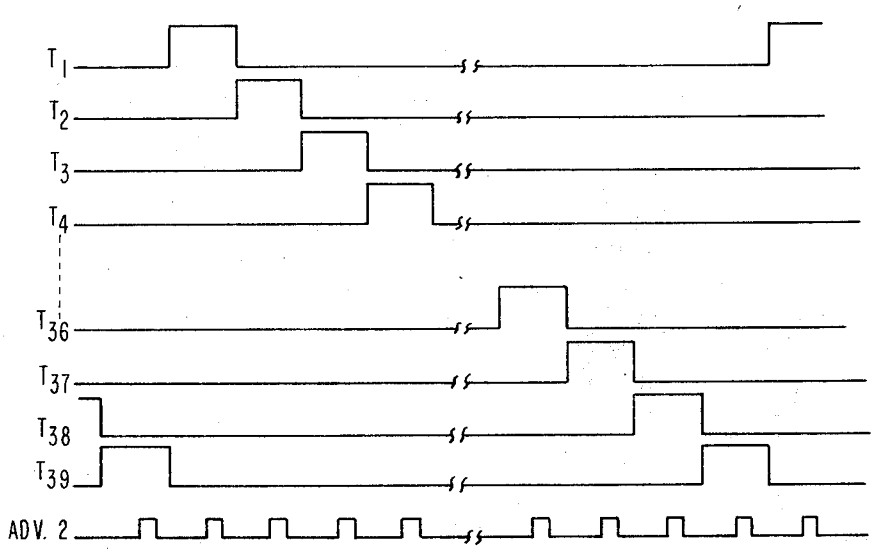

FIG. 5 is a waveform diagram illustrating the relationship between the various timing pulses employed in the invention.

Figure 1:
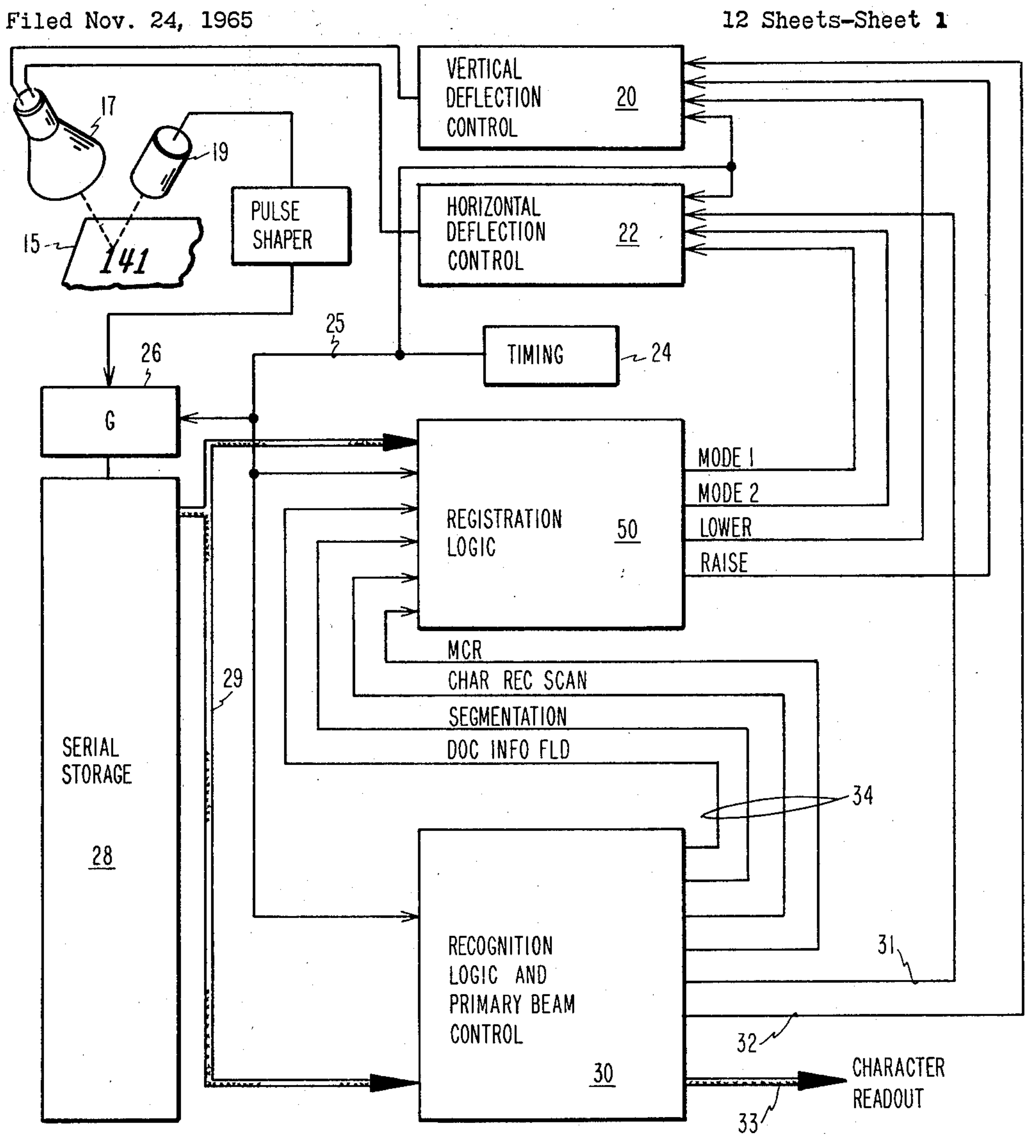
FIG. 1 is a schematic diagram illustrating the overall arrangement of elements of a character recognition machine employing the scan centering device of the present invention.
Figure 6:
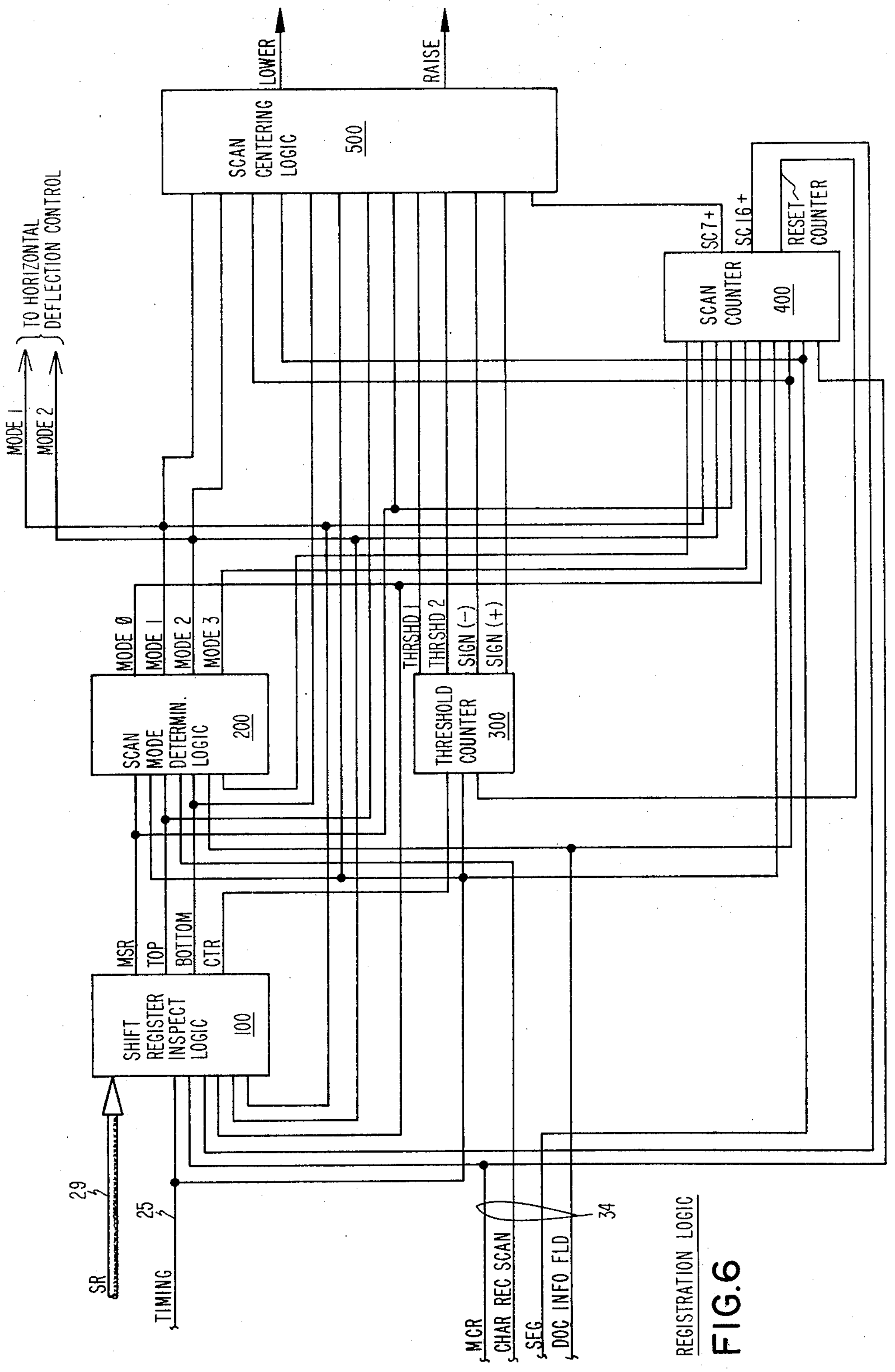

FIG. 6 is a schematic diagram showing the overall arrangement of circuit elements within the registration logic circuit of FIG. 1.

Figure 7:
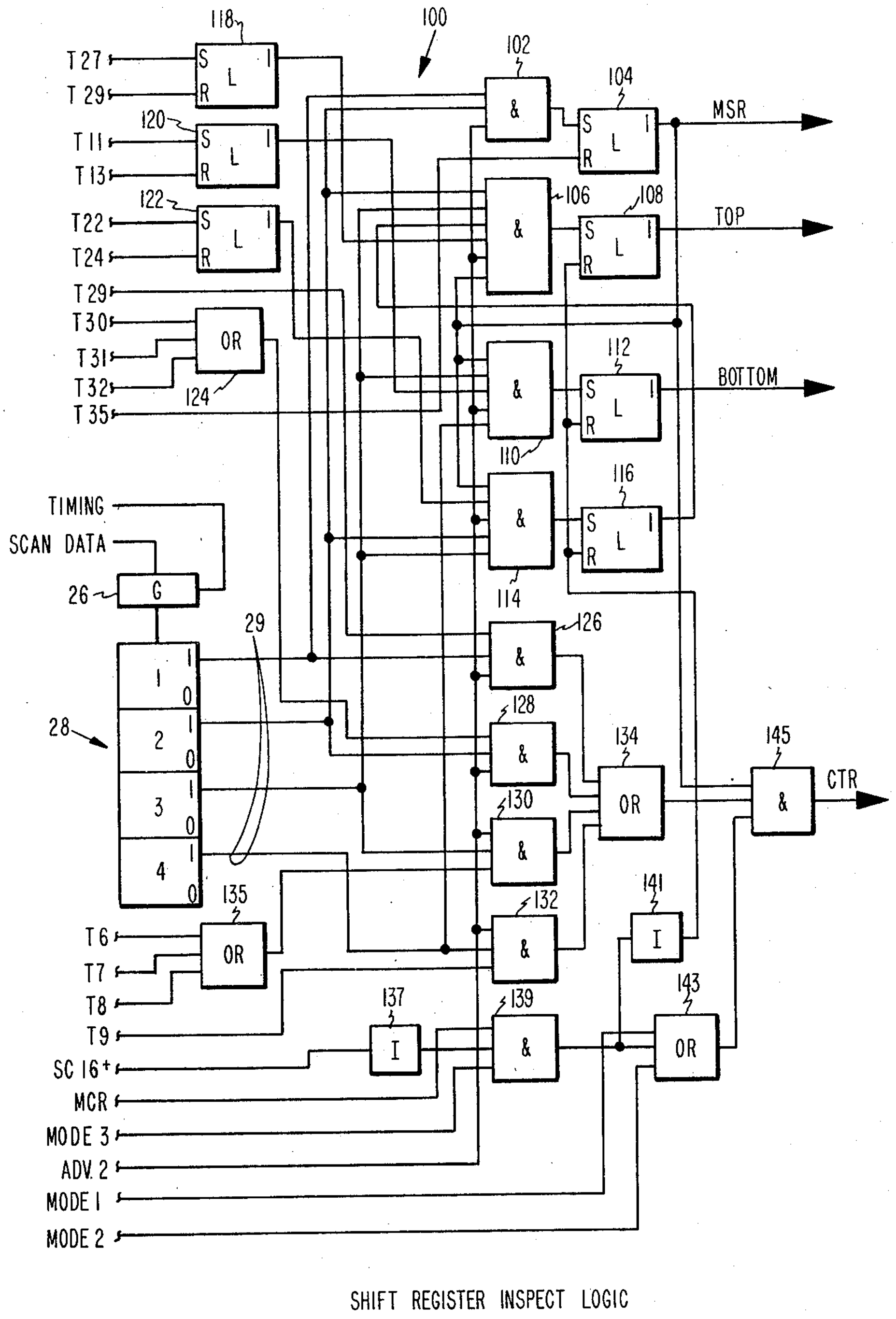

FIG. 7 is a schematic diagram of the shift register inspect logic circuit of FIG. 6.

Figure 8:
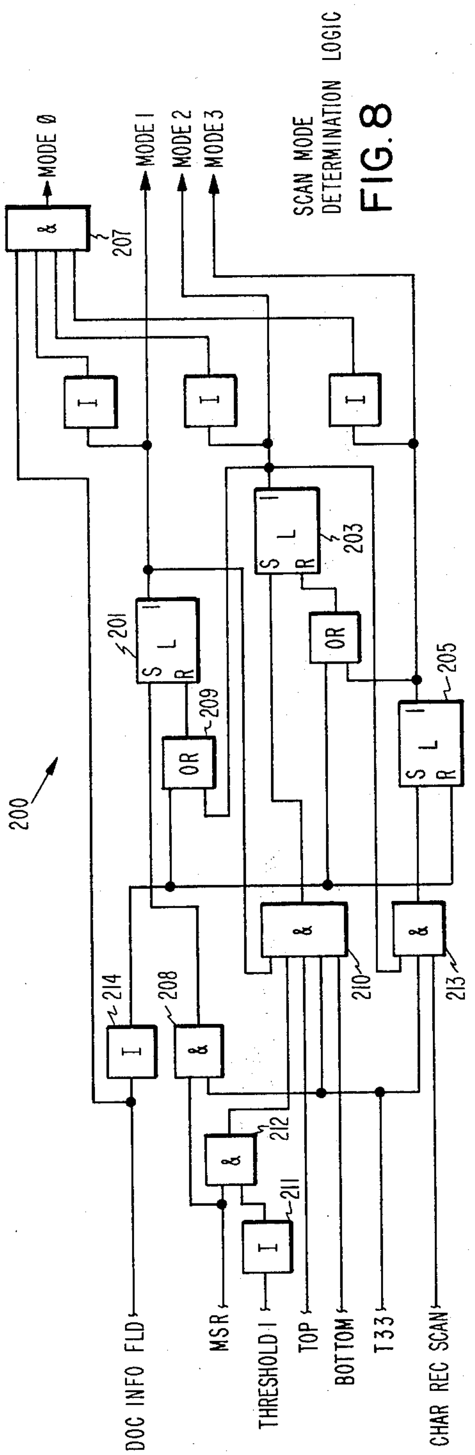

FIG. 8 is a schematic diagram of the scan mode determination logic circuit of FIG. 6.

Figure 9A:
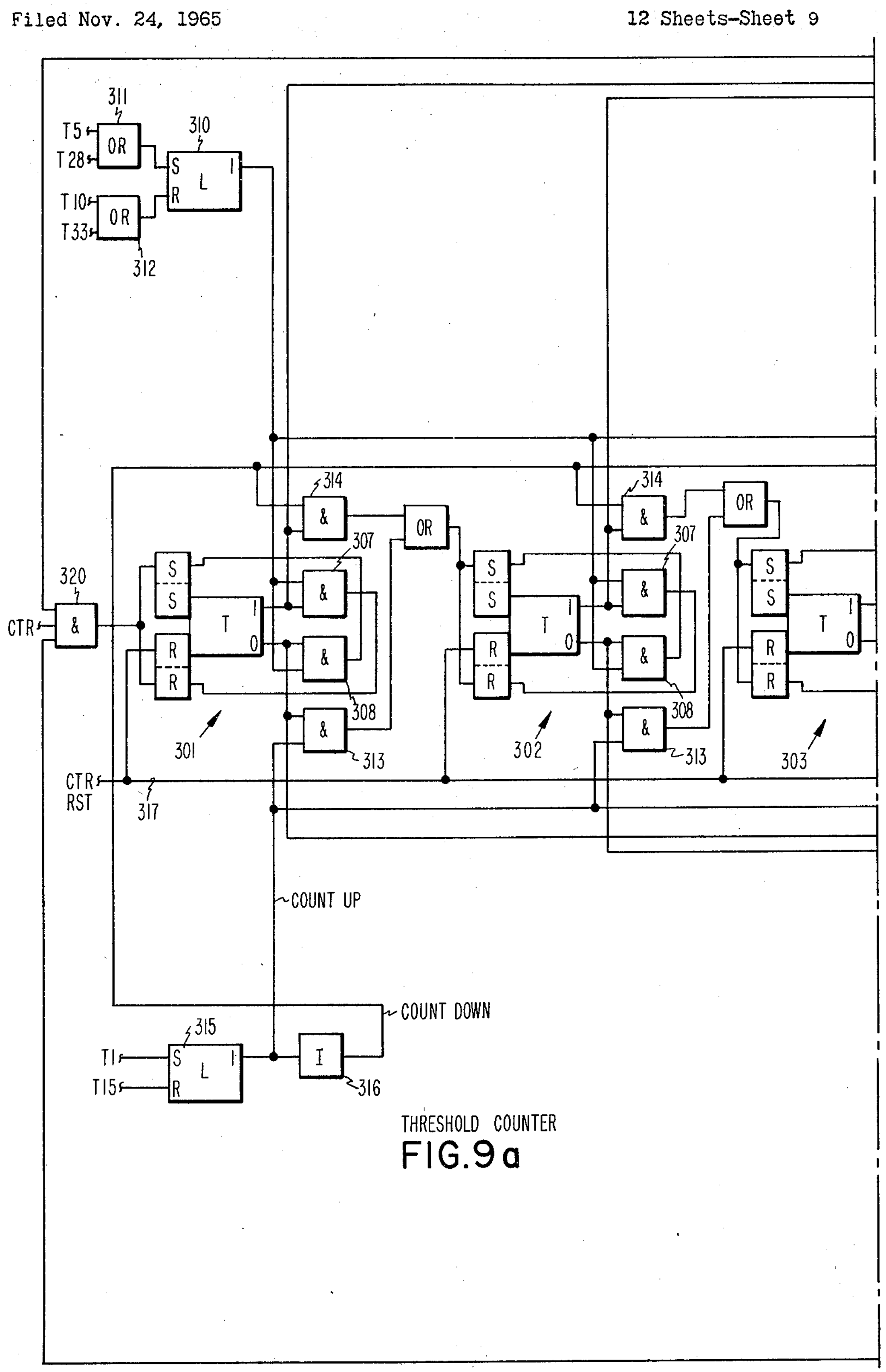
Figure 9B:
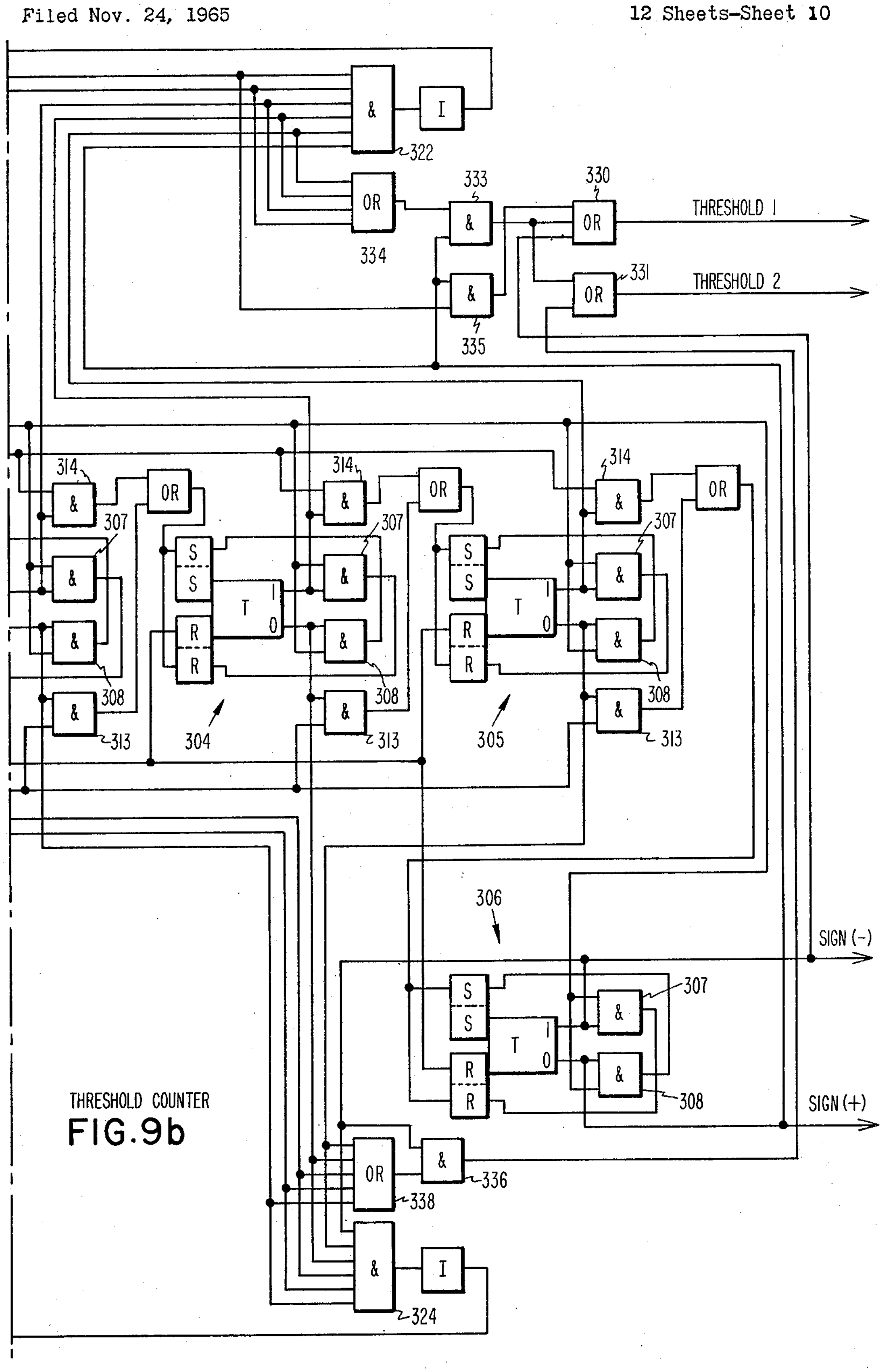

FIGS. 9*a* and 9*b*, taken side-by-side, are a schematic diagram of the threshold counter circuit of FIG. 6.

Figure 10:
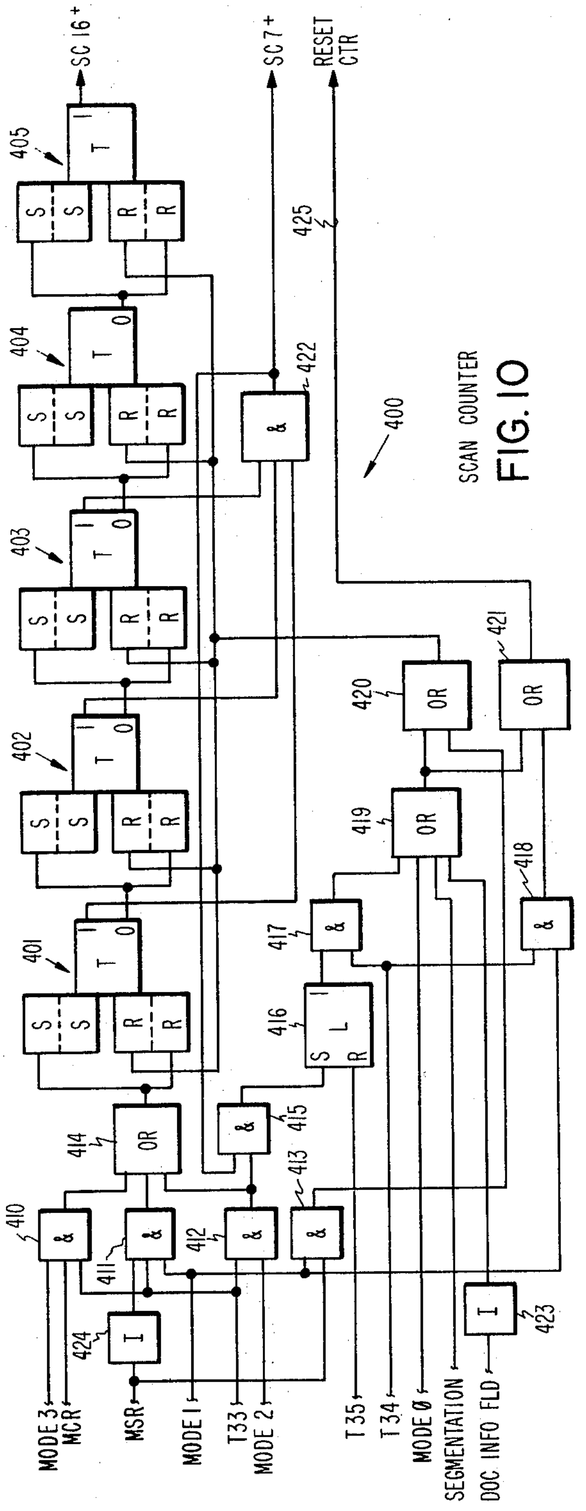

FIG. 10 is a schematic diagram of the scan counter circuit of FIG. 6.

Figure 11:
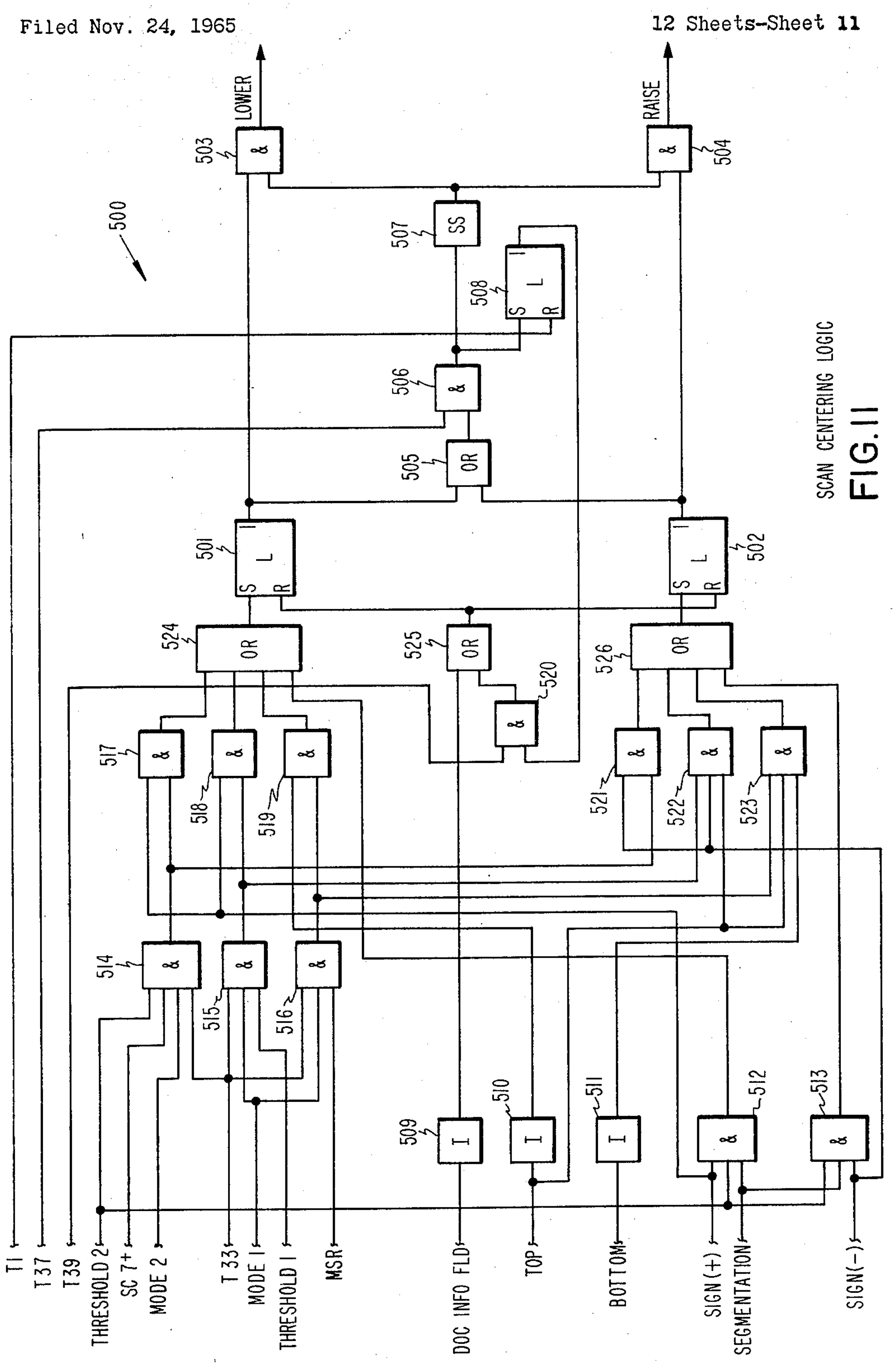

FIG. 11 is a schematic diagram of the scan centering logic circuit of FIG. 6.

Figure 12:
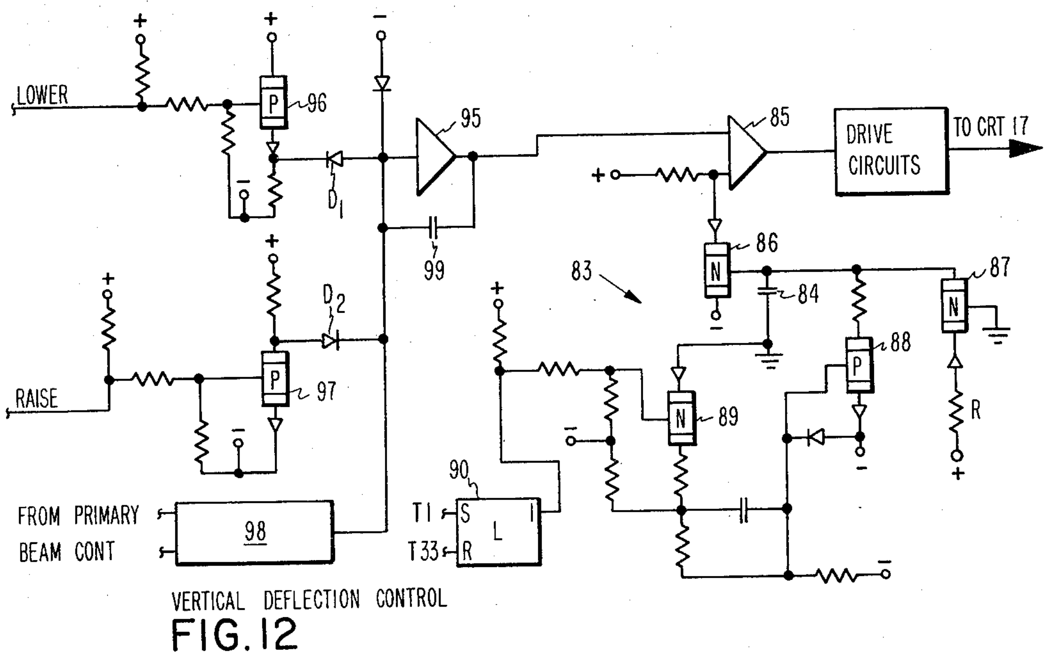

FIG. 12 is a schematic diagram of the vertical deflection control circuit of FIG. 1.

Figure 13A:
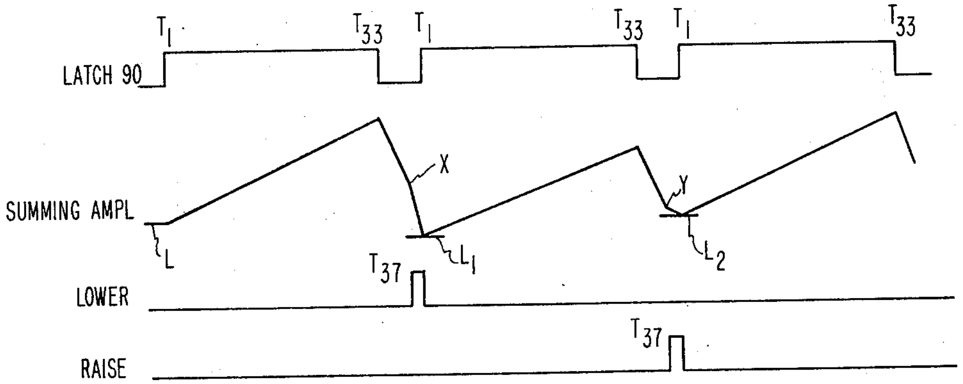

FIG. 13*a* is a waveform diagram illustrating the operation of the circuit of FIG. 12.

Figure 13B:
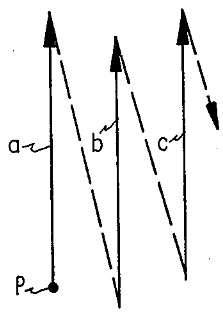

FIG. 13*b* is a diagram illustrating the manner in which the circuit of FIG. 12 controls the position of the vertical field of scan, of the scanner of FIG. 1.

GENERAL DESCRIPTION

A character recognition machine incorporating the scan centering device of the present invention is schematically shown in FIG. 1. A cathode ray tube flying-spot scanner 17 casts a beam of light on a document 15. The beam, after reflection from the surface of the document, is sensed by photomultiplier tube 19, which provides video output data. The beam from scanner 17 is controlled by a vertical deflection control circuit 20 and a horizontal deflection control circuit 22, which supply signals to the conventional beam control components of scanner 17 to move the beam to any desired position on the document surface.

A recognition logic and primary beam control circuit 30 transmits, on lines 31 and 32, control inputs to the deflection circuits 20 and 22 to drive the scan beam through predetermined search and scan patterns. Such patterns are necessary for rudimentary beam control such as is required to initially position the beam at some starting point in the information field of the document, to search for the first line to be scanned and to shift from one line to the next during the scanning operation. These basic control means do not form a part of the present invention and are not herein described in detail. An example of one type of basic beam control scheme is that disclosed in co-pending patent application Ser. No. 478,368, filed Aug. 9, 1965.

Once the first line of characters on a document is located by the beam, scanning is performed by driving the beam through a series of vertical scans, each scan being horizontally displaced from the previous scan. The vertical field of scan is determined by the height of an individual vertical scan and, for the purposes of the present invention, is assumed to be fixed. However, it may be desirable in some instances to provide means for varying the height of the vertical field of scan in accordance with the height of characters to be read. Such a system is disclosed in co-pending patent application, Ser. No. 419,428, filed Dec. 18, 1964.

Each vertical scan proceeds, preferably but not necessarily, from the bottom to the top of the information band (FIG. 2) of the line being scanned. Each scan is synchronized with the remaining components of the system through a timing circuit 24. As the scanning beam moves upwardly through a vertical scan, photomultiplier 19 feeds an output signal through a pulse shaper to a gating circuit 26. The instantaneous magnitude of the output signal varies in accordance with the magnitude of light reflection from the document. The pulse shaper quantizes and clips the output signal so as to enhance the definition contained therein of black and white areas on the document. This shaped video signal is "segmented"

by gating circuit 26, which is driven by timing circuit 24, and each segment or data pulse thereof is gated into a serial storage device 28 such as a shift register. In the present embodiment each vertical scan is divided into 32 segments, each segment comprising a "1" or a "0" level pulse depending upon whether the corresponding pulse is intended to represent a black area or a white area on the document. As graphically shown at 36 of FIG. 3, segment 32 of a scan corresponds to the lowest portion of the scan while segment 1 corresponds to the highest portion.

The data pulses shifted into the shift register 28 represent a digitized "picture" of that portion of the document covered by the scan. The individual storage positions in the register are connected via multi-wire bus 29 both to a registration logic circuit 50, which controls scan centering in accord with the principles of the invention, and to the recognition logic and primary beam control circuit 30. The shift register may be any conventional binary shift register such as, for example, is disclosed in the previously mentioned patent application, Ser. No. 419,428.

Under control of timing circuit 24, coincidence circuits in the main logic circuit 30 inspect the various data patterns shifted through the register 28, matching them against stored information representing the data patterns generated by known characters. As each character is recognized, a coded representation thereof is issued on output line 33 to whatever utilization means may be connected thereto.

The main logic circuit 30, besides identifying characters, also generates what might be termed "format" type information, which is transmitted to registration circuit 50 on lines 34. The signals on output lines 34 are defined by the terms MCR, CHAR REC SCAN, SEGMENTATION and DOC INFO FLD. These signals represent the following information:

MCR—"Minimum Character Requirement"—This signal informs the registration circuit 50 that the scanner has located a character. The signal may be generated, for example, by detection in the recognition circuit 30 of a scan containing at least two consecutive black segments.

CHAR REC SCAN—"Character Recognition Scan"—This signal informs the registration circuit 50 that the recognition logic in the main circuit 30 has been enabled and is prepared to receive recognition data.

SEGMENTATION—This signal informs the registration circuit that the scanner is between characters. The signal may be generated, for example, in response to detection by the recognition circuit of one or two consecutive vertical scans which are void of black segments.

DOC INFO FLD—"Document Information Field"—This signal informs the registration logic that the primary beam control has positioned the scanning beam to its "starting point" in the information field on the document and a line search operation is ready to begin. This signal may be generated, for example, by detection of an edge of the document or of some pre-printed known reference point on the document.

Figure 2:
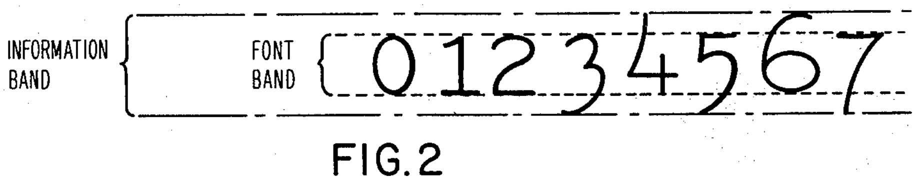
FIG. 2 is a diagram illustrating the difference between an "information band" and the "font band" contained therein.
Figure 3:
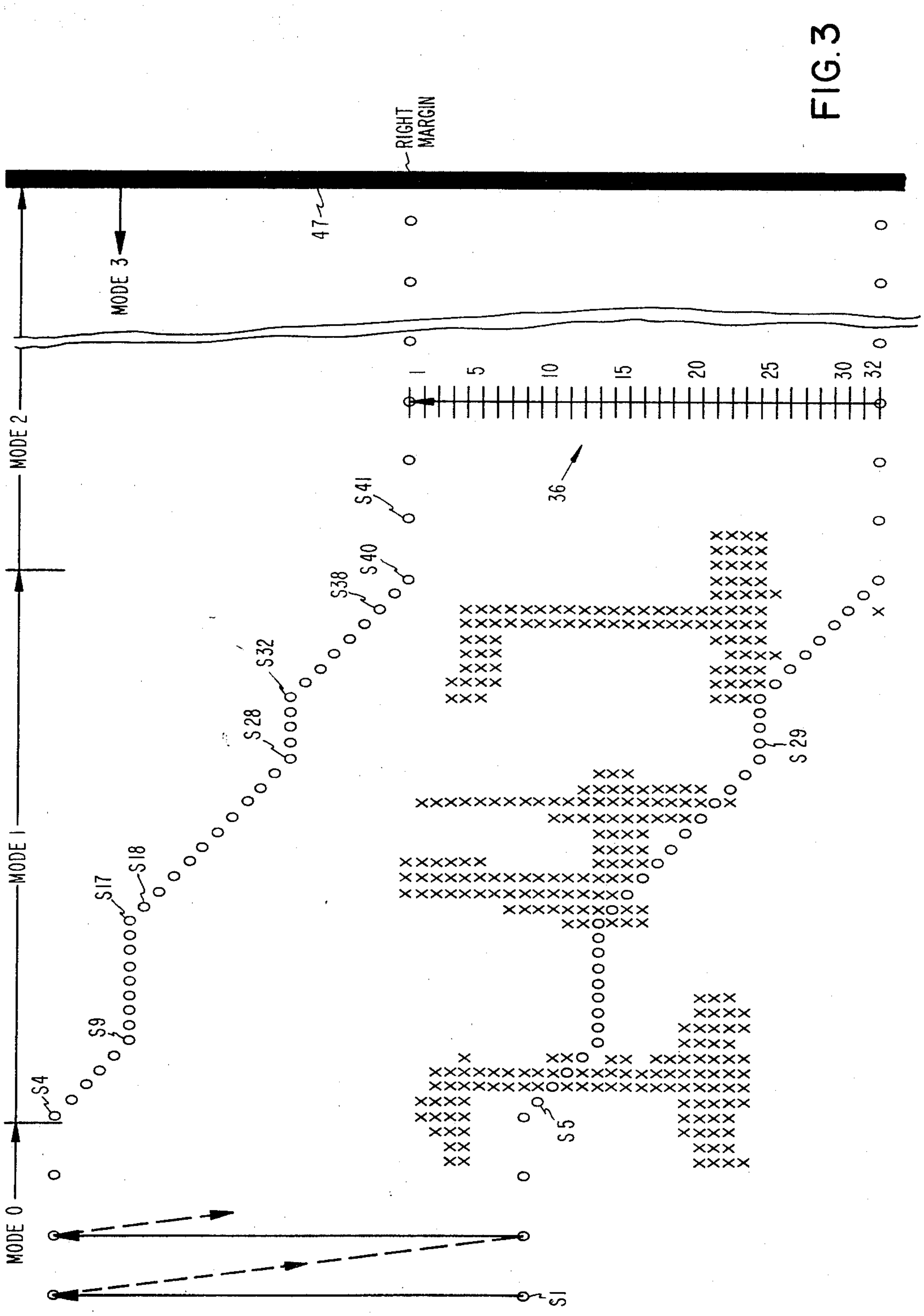
FIG. 3 is a diagram depicting the various modes of operation of a preferred embodiment of the scan centering device of the invention.

A general description of the operation of registration circuit 50 in performing its novel scan centering function in accordance with the present invention is hereinafter given with reference to FIGS. 2, 3 and 4. FIG. 3 graphically depicts the manner in which the registration circuit controls the scanner in centering the vertical field of scan on a line of characters. The numerals "141" shown in FIG. 3 constitute the first three characters of an exemplary information line on the document. The line may or may not be the first line on the document; the operation of the registration circuit is the same in any case. Starting near the left margin of the information field, the primary beam control circuit positions the scan beam at a starting point S1 and begins moving the beam through a scanning pattern designated as "mode zero," as shown. Mode zero scanning constitutes a predetermined search pattern utilized for the purpose of finding the first character in the line. When the registration circuit detects a scan containing two consecutive black segments, it shifts the horizontal deflection control circuit out of mode zero and into a mode 1 scanning pattern.

Mode 1 scanning

Mode 1 scanning is specifically for the purpose of centering the vertical field of scan on the character line. As shown in FIG. 3, the horizontal displacement between consecutive vertical scans is one-fourth of what it was in mode 0. This is so a maximum amount of registration data can be generated over the least amount of scan distance, thus enabling the initial scan centering to take place over the least number of characters. FIG. 3 shows the vertical field of scan as outlined by two parallel rows of zeros. The characters are depicted as they are "seen" by the shift register 28. For the purposes of illustration, the full characters are shown, while it is to be understood that the only portions of the characters actually seen by the shift register are those portions lying in the vertical field of scan (between the rows of zeros). Each column of X's represents the information generated into the shift register during one vertical scan, each X representing those of the vertical scan segments detected to be black. In mode 1 scanning the registration circuit 50 inspects each vertical scan and produces scan centering feedback signals in accordance with the data pattern detected, as is hereinafter explained.

With reference to FIG. 4*a*, the logical functions performed by the registration circuit 50 while operating in mode 1 are hereinafter described. It is to be understood that the various logical blocks shown in FIGS. 4*a*, 4*b* and 4*c*, do not necessarily represent specific structural elements but rather are intended only to represent the capability of the circuit 50 for performing a given logical function. The 32 segments of a given vertical scan are illustrated at the left of the figure in the order in which they are assembled and shifted into the register 28.

In mode 1, circuit 50 operates to generate scan centering feedback signals in response to two types of scan characteristics. The first of these characteristics, herein called "scan history" is determined by whether black has been detected at any time during mode 1 in an upper scan portion consisting of segments 6, 7 and 8, a mid-portion consisting of segments 11, 12 and 13 and a lower portion consisting of segments 23, 24 and 25. Whenever two consecutive black segments (one black segment by itself is not considered significant) are detected in one of these three scan portions by respective coincidence means 51, 52, 53, 54, 55 and 56, the associated storage means 61, 62 and 63 is activated. If, for example, segments 6 and 7 are both detected to be black for a given scan, logical AND 51 activates storage means 61. Activation thereof indicates that the "top condition" has been met, meaning that the desired data pattern has been detected in the specified upper portion of a scan. Similarly, logical AND means 53 and 54 inspect the mid-portion of the scan and when the desired data pattern is detected, activate storage means 62 to indicate that the "center condition" has been met. A "bottom condition" output is generated by AND means 55 and 56 to activate storage means 63.

The second type of scan characteristic detected by the circuit 50 during mode 1 is herein called "scan balance." This characteristic is governed by the relative amount of black detected in an upper scan portion consisting of scan segments 2, 3 and 4 as compared with the amount of black detected in a lower portion of the same scan consisting of segments 27, 28 and 29. These upper and lower portions which are monitored for scan balance are equally spaced from the midpoint of the scan, which in the present embodiment is taken to be between scan segments 15 and 16. Thus, as is described subsequently, centering of the field of scan on a line of characters is achieved, at least in part, by generation of feedback signals which act to balance (reduce the comparison to zero) the amounts of black detected in each of these two scan portions. The comparison operation is performed by a threshold counter means 70 which is adapted to generate outputs indicative of the sign as well as absolute magnitude of each such comparison. For the purpose of determining each such comparison, segment 4 of the upper portion is given twice the weight of segments 2 and 3 and segment 27 of the lower portion is given twice the weight of segments 28 and 29. To accomplish the comparison the counter 70 is driven backward one increment each time black is detected in one of the segments 2 or 3 and is driven two increments backward in response to black in segment 4. The counter is driven forward one increment by black in each of the segments 28 and 29 and forward two increments by black in segment 27. The comparison is thus indicated by the condition of the counter after each scan.

After each scan in mode 1 the outputs from storage means 61, 62 and 63 and threshold counting means 70 are sampled and, depending on the condition of these outputs, feedback signals to lower the vertical field of scan, raise the vertical field of scan and to terminate mode 1 operation and begin mode 2 operation are generated in accordance with the following rules:

(1) Lower the vertical field of scan one position (segment) if the scan balance (absolute value of the count in counting means 70) is equal to or greater than 1 AND the sign of the count is positive; OR Lower the field of scan one position if the top and center scan history conditions have not been satisfied.

(2) Raise the vertical field of scan one position if the top and center conditions have been satisfied AND.

Either the absolute value of the count is equal to or greater than 1 AND the signal is negative, OR the count is less than 1 AND the bottom condition has not been satisfied.

(3) End mode 1 scanning if the top and bottom conditions have been satisfied AND the net count is less than one.

Thus, logical AND means 72 and logical OR means 67 provide an input to logical AND means 68 to generate "lower" feedback signals in accordance with the first portion of rule 1 while AND 65 and inverter 66 feed OR 67 to provide an input to AND 68 in accordance with the second half of rule 1. The function of AND 68 is required since it is desirable to generate a feedback signal only if the minimum scan requirement (MSR) has been satisfied during the scan. The minimum scan requirement requires detection of two consecutive black segments in the scan.

AND 65 feeds AND 76 to implement the first half of rule 2 and AND 73 and AND 74 feed AND 76 through OR 75 to satisfy the second half of rule 2 to provide a feedback pulse to raise the vertical field of scan.

Rule 3 is implemented by AND 77 which receives its inputs from AND 69 and the counter 70.

It can be seen from the above rules that the scan registration logic is "biased" toward moving the field of scan downward. This is desirable in any system where the lines on the document are scanned top to bottom. This is so because in scanning downwardly, it is more likely that when two lines are initially within the vertical field of scan the bottom one is the one the scanner should center on, the top one being the line last scanned. This bias is imposed on the system by requiring *both* the top and center conditions to have been satisfied in order to cause a "raise" feedback signal to be generated while a "lower" signal is generated simply if neither the top nor center condition have been satisfied or if a "scan balance" equal to or greater than +1 is detected. Thus, in a situation where two lines simultaneously project an equal amount into the field of scan, the feedback will lower the field of scan to center on the bottom line. In order to cause the feedback to raise the field of scan to center on the top line, the top line must project at least twelve segments into the field of scan while at the same time the lower line projects no more than 8 segments into the field. This scheme is based on the assumption that in scanning a document from top to bottom, "overshifting" of the field of scan in searching for the next line will cause more black to appear at the top of the field than at the bottom and that therefore equal amounts of black at the top and bottom indicate an "undershift," requiring the field to be moved downwardly.

AND 77 generates an output when all three scan history conditions, top, center and bottom, have been met and the threshold count is zero. This indicates that the field of scan has been centered on the line and that it is desirable to switch out of mode 1 and into mode 2 operation. In FIG. 3 this condition is achieved during scans S40.

Mode 2 scanning

Mode 2 scanning is performed for the purpose of tracking the line of characters out to the right-hand margin of the document. After detecting the right-hand margin, the scanner re-scans the line from right to left for the purpose of character recognition, which is performed during mode 3 scanning, as discussed below. Scan centering during mode 2 operation is performed by circuit 50 as indicated by the functional logic diagram of FIG. 4*b*. As there shown "scan balance" is the only characteristic monitored. Counting means 70 inspects upper and lower scan portions of each scan as in mode 1, but feedback signals are generated after seven scan, rather than one scan, intervals. The rules governing operation in mode 2 are as follows:

(1) Lower the vertical field of scan one position (segment) if after seven scans the absolute value of the count is equal to or greater than two AND the sign of the count is positive.

(2) Raise the vertical field of scan one position if after seven scans, the count is equal to or greater than two AND the sign of the count is negative.

Logical AND means 78 implements the first rule while logical AND means 79 implements the second rule. In addition, scan counting means are utilized for resetting the threshold counting means and sampling AND's 78 and 79 after every seven scans. As is shown in FIG. 3, the horizontal displacement of scans in mode 2 is four times what it was in mode 1. Scanning thus proceeds much more rapidly. The seven scan interval between feedback signals is feasible since the field of scan is already centered on a line of characters when mode 2 scanning begins, and adjustments in the vertical position of the field of scan are therefore not required as frequently as in mode 1.

Mode 3 scanning

Mode 3 scanning begins when the right-hand margin of the document information field, which, for example, may be denoted by a pre-printed strip 47 on the document (FIG. 3), is detected by the recognition logic circuit 30. When this occurs a CHAR REC SCAN issues on line 34, FIG. 1, to registration circuit 50, causing the mode 2 signal issuing therefrom to cease and a mode 3 signal to be initiated. This causes the horizontal deflection control circuit 22 to reverse its direction to re-scan the line and to decrease displacement between vertical scans to the amount employed during mode 1. In mode 3 scanning, the registration circuit 50 performs a line following function as in mode 2 except that, since character recognition is taking place, readjustments in the position of the vertical field of scan are effected only during the time the scanner is between characters. To do otherwise would unnecessarily complicate the operation of the recognition circuits. Logical function of the circuit 50 is schematically shown in FIG. 4*c*. As is evident from the diagram, operation is the same as in mode 2 except that gating means 81 are brought into play and the signal for resetting counter means 70 and for sampling AND's 78 and 79 occurs between characters rather than at seven scan intervals. This signal is also used to open gating means 81. The latter means is provided to minimize the size of the counter 70. The gate is closed by the scan counting means after the first 15 scans of each character in mode 3. Sufficient data is thus generated for scan centering purposes without having to provide the counter 70 with the capacity to count a full 20 to 25 spaces (maximum character width).

The purpose of the aforementioned weighted "scan balancing" technique may be best understood at this point. By placing twice the count value on data in scan segments 4 and 27 as compared to data in segments 2, 3, 28 and 29, a dampening of the feedback response of the system under certain circumstances is accomplished. These circumstances are demonstrated with reference to FIG. 2. There, it is shown that with a typical numeral font design characters such as 3, 5 and 7 have "tails" projecting lower than the lower extremities of the average character. Similarly, other characters such as 4 and 6 have tops which project higher upwardly than most other characters. Since these tails and tops represent normal line irregularity, it is desirable to suppress the tendency of the system to readjust the vertical field of scan in response to them.

This is done by doubling the "weight" assigned to the scan segments (4 and 27) located immediately adjacent to and just outside of the font band. Thus in mode 2 or mode 3 scanning when a properly positioned 3, for example, is detected, the threshold counter is advanced to well over a positive threshold 2 level due to the effect of the tail of the 3, causing the field of scan to be lowered by a segment. This readjustment pushes the top of the 3 into segment 4, a doubly weighted segment, so that during the next series of scans the negative count fed to the threshold counter because of black detected in segment 4 has a greater offsetting effect than if the segment were singly weighted. Thus the tendency of the system to readjust in this situation is dampened. Similarly, when a correctly positioned 6 is detected, the field of scan is raised a segment because of the character top. This pushes the bottom of the 6 into doubly weighted segment 27, bringing about the same dampening effect in the opposite direction.

DETAILED DESCRIPTION

With reference now to FIGS. 5–13 detailed description is hereinafter given of circuits suitable for implementing the general logical function of the invention, discussed above. FIG. 6 shows the interrelation of the basic logic circuits of registration circuit 50. Inputs to the total circuit are shown on the left coming from shift register 28 via bus 29, from timing circuit 24 via bus 25 and from the recognition logic and primary beam control circuit 30 via lines 34 as previously explained. The circuit 50 comprises a shift register inspect logic circuit 100, a scan mode determination logic circuit 200, a threshold counter circuit 300, a scan counter circuit 400 and a scan centering logic circuit 500. In the case of each of these circuits, inputs are shown entering from the left and outputs issuing from the right. Outputs from the circuit 50 issue on MODE 1 and MODE 2 lines from scan mode determination logic circuit 200 to the horizontal deflection control circuit and on LOWER and RAISE lines from the scan centering logic circuit 500 to the vertical deflection control circuit.

FIG. 5 illustrates the sequence of timing pulses produced by timing circuit 24. The timing circuit comprises a conventional 39 position timing ring for generating 39 sequential timing pulses T1–T39 and an associated multivibrator for generating an ADV 2 pulse train consisting of a continuous series of pulses each one of which is one-fourth the duration of one of the timing pulses $T_1$–$T_{39}$ and each one of which occurs during the third quarter of a different one of the pulses T1–T39. A circuit suitable for performing the function of timing circuit 24 is shown and described in detail in the aforementioned copending patent application, Ser. No. 419,428. As will be subsequently described in detail, each vertical scan performed by the scanner in modes 0, 1, 2 and 3 begins at T1 and terminates at the conclusion of T32. During the period T33 through T39, the beam (in a blanked out condition) is moved horizontally and downwardly to the starting point of the next vertical scan.

Shift register inspect logic

The shift register logic circuit 100 is shown in detail in FIG. 7. Circuit 100 receives inputs via lines 29 from the "1" side of each of the first four storage positions of the shift register 28. As previously explained, the video data from each vertical scan is serially shifted into the register 28 in the order in which it is generated, a "1" representing black and "0" representing white. Thus, since each vertical scan begins at the bottom of a character and proceeds upwards to the top of the character, at T1 scan segment 32 is in position 1 of the register 28, at T2 segment 32 is in position 2 and segment 31 in position 1, etc., until at T32 segments 1, 2, 3 and 4 of the vertical scan are in positions 1, 2, 3 and 4 of the register. The circuit 100 inspects the data thus shifted through the four shift register positions and generates MSR, TOP, BOTTOM and CTR outputs in response thereto.

An MSR—"Minimum Scan Requirements"—signal is generated whenever two consecutive black segments are detected in any one vertical scan. To accomplish this, AND circuit 102 receives inputs from the first two storage positions of the register 28 and from timing pulse ADV 2. Thus ADV 2 gates an output to set latch circuit 104 any time that register positions 1 and 2 both are in a "1" state, indicating the presence of two consecutive black segments in the video data. The MSR output signal is taken from the set side of latch 104.

The TOP signal issues from the set side of a latch circuit 108 and indicates that both the top and center conditions, defined in the previous discussion of logical function in connection with FIG. 4*a*, have been satisfied. A center condition latch 116 is set by an AND circuit 114 during any vertical scan in mode 1 wherein two consecutive black segments are detected in segments 11 and 12 or segments 12 and 13. AND 114 receives inputs from MSR latch 104, from ADV 2, from shift register positions 2 and 3 from the set side of a timing latch 122. Latch 122 is set at the beginning of T22 and reset at the beginning of T24, thus being in a set condition during the periods T22 through T23. Since at T22 scan segment 12 is in position 2 of the shift register and segment 13 is in position 3 and at T23 segment 11 is in position 2 and segment 12 in position 3, AND 114 inspects for the data patterns required to satisfy the center condition. When a center condition is thus detected, center latch 116 is set, providing an output to AND circuit 106. AND 106 also inspects positions 2 and 3 of the shift register and receives conditioning inputs from MSR latch 104 and ADV 2. AND 106 is under the control of timing latch 118 which enables AND 106 during the time periods T27 through T28. Since at T27 scan segment 7 is in position 2 of the shift register and segment 8 is in position 3, and at T28 segment 6 is in position 2 and segment 7 in position 3, AND 106 generates an output when both the top and center conditions previously discussed in condition with FIG. 4*a* have been satisfied. AND 106 sets top latch 108, generating a top signal indicative that both the top and center logic condition have been satisfied. It is to be noted here that, due to the operation of AND 106, top latch 108 cannot be set until center latch 116 has been set. In the previous general description given in connection with FIG. 4*a*, it was stated that top condition storage means 61 could be operated independently of center condition storage means 62. This explanation was used for the purpose of keeping the description of logical function as clear and direct as possible. The circuit implementation actually employed, it will be noted, accomplishes exactly this same logical result and saves an AND circuit and output line the process.

The BOTTOM output signal is taken from the set side of bottom latch 112 which is set by an output from AND 110. AND 110 receives inputs from positions 3 and 4 of the shift register and is enabled by MSR and ADV 2 pulses and by the set side of timing latch 120. Latch 120 is set during T11 through T12. Since at T11 segment 24 is in position 3 of the shift register and segment 25 is in position 4 and at T12 segment 23 is in position 3 while segment 24 is in position 4, AND 110 provides an output to set bottom latch 112 during any scan in wherein a video is detected to occur consecutively in segments 23 and 24 or in segments 24 and 25. Latch 112 therefore provides a BOTTOM output indicative that the bottom condition previously discussed in connection with FIG. *4a* has been satisfied.

AND circuit 145 generates an output for incrementing the threshold counter 300 to effect "scan balance" comparisons. AND 145 receives enabling pulses from MSR latch 104 and from an OR circuit 143, the latter of which receives MODE 1 and MODE 2 input signals from scan mode determination logic circuit 200 and from an AND circuit 139. AND 139 performs the function of gating means 81, previously discussed in connection with FIG. *4c*, in that during mode 3 operation it inhibits inputs to threshold counter 300 after the first fifteen scans performed on each character. This is done by feeding input SC16+ from scan counter 400, to be described in detail subsequently, to AND 139 through an inverter 137. Thus, during mode 3 scanning, when the scan counter reaches a count of 16 and issues a SC16+ signal, AND 139 is deconditioned, deconditioning AND 145 to block further advance of counter 300.

AND circuits 126, 128, 130 and 132 inspect the first four positions of shift register 28 at the required time periods to cause AND 145 to generate counter incrementing pulses in accordance with the "weighted" counting scheme previously discussed. AND 126 is enabled during T29 to inspect the first position of the shift register which at that time represents the condition of scan segment 4. If scan segment 4 is black, AND 126 is activated by ADV 2 to issue an output pulse which is passed by OR 134 to activate AND 145. This output drives threshold counter 300 one increment in a negative direction as is subsequently described.

AND circuit 128 is enabled through OR 124 during each of the time periods, T30, T31 and T32 to inspect position 2 of the shift register. At T30, position 2 represents the condition of scan segment 4, at T31 it represents the condition of scan segment 3 and at T32 it represents the condition of scan segment 2. Thus, should any of those scan segments be black, AND 128, driven by ADV 2, issues an output pulse which passes through OR 134 and AND 145 to advance threshold counter 300 one increment in a negative direction. At this point it will be noted that when scan segment 4 is black it causes two counter incrementing pulses to issue from AND 145, one at T29 and one at T30. This is the manner in which the effect of scan data in segment 4 is doubled as previously discussed in the General Description.

AND 130 is enabled through OR circuit 135 during each of the time periods T6, T7 and T8 to inspect position 3 of the shift register. At T6 scan segment 29 is in position 3, at T7 scan segment 28 is in position 3 and at T8 scan segment 27 is in position 3. Therefore, if any of these scan segments are black, AND 130, driven by ADV 2, issues an output pulse which passes through OR 134 and activates AND 145, generating a CTR signal to step the threshold counter one increment in the position direction. AND 132 is enabled at T9 to inspect position 4 of the shift register. At T9 the state of position 4 represents the condition of scan segment 27. Therefore, when segment 27 is black AND 132, driven by ADV 2, issues a pulse which passes through OR 134 and activates AND 145 to increment the threshold counter by 1 in the positive direction. As in the case of segment 4 above discussed, the "weight" of data in segment 27 is doubled since both AND circuits 130 and 132 are activated when the scan segment 27 is black.

Scan mode determination logic

Circuit details of scan mode determination logic circuit 200 are shown in FIG. 8. The output signals generated by this circuit indicate the type of scanning being performed. As previously discussed, mode 0 scanning is performed when searching for the first character in a line, mode 1 scanning is performed to center the vertical field of scan on the line, mode 2 scanning is performed to maintain the field of scan on center as the line is followed out to the right-hand margin of the document and mode 3 scanning is performed as the line is rescanned from right to left for the purpose of character recognition. A MODE 1 output is taken from the set side of a latch circuit 201, a MODE 2 output is taken from the set side of a latch circuit 203 and a MODE 3 output is taken from the set side of a latch circuit 205. A MODE 0 output is taken from an AND circuit 207 which is activated whenever all of the latches 201, 203 and 205 are not set and a DOC INFO FLD signal is received from the main recognition circuit 30 indicating that a line search operation is in order.

Mode 1 latch 201 is set in response to a signal from AND circuit 208, which is activated by an MSR input from circuit 100 by timing pulse T33. Latch 201 is reset by discontinuance of the DOC INFO FLD signal from the circuit 300 of by the setting of latch 203.

Mode 2 latch 203 is set by an output from an AND circuit 210 which output is generated in response to a set output from latch 201, TOP and BOTTOM signals from circuit 100, timing pulse T33 and the coincidence of an MSR signal from circuit 100 with no THRESHOLD 1 signal from threshold counter 300. The latter coincidence is determined an inverter 211 and an AND circuit 212. AND 210 thus sets mode 2 latch 203 in accordance with the logical conditions previously set forth as rule 3 for mode 1 scanning. This indicates that the vertical field of scan has been centered on the line of characters and the system should shift from mode 1 operation to mode 2 operation. Latch 203 is reset by the setting of latch 205 or by discontinuance of the DOC INFO FLD signal.

Mode 3 latch 205 is set by an output from an AND circuit 213 which is activated at T33 in response to a CHAR REC SCAN signal from main circuit 30. The setting of latch 205 resets latch 203. Latch 205 is reset when the DOC INFO FLD signal from circuit 30 is discontinued.

Threshold counter

A detailed circuit diagram of threshold counter circuit 300 is shown in FIGS. *9a* and *9b*, taken together side by side. As previously explained in the general description with reference to FIGS. *4a*, *4b* and *4c*, the threshold counter periodically compares the amount of data contained in an upper scan portion consisting of scan segments 2, 3 and 4 with that contained in a lower scan portion consisting of scan segments 27, 28 and 29. This is done on a per scan basis or on the basis of data accumulated over a plurality of scans, depending upon the mode of scanning being performed. The threshold counter compares the amount of data in the two scan portions by counting in a first direction in response to data in the first portion and counting in the opposite direction in response to data in the second portion. The condition of the counter at the completion of this forward-reverse counting operation, or of a plurality of forward- reverse counting operations, represents a net count having a magnitude and sign indicative of the desired comparison.

The inputs to the counter consist of the necessary timing signals from the timing circuit 24, CTR drive pulses from shift register inspect logic 100, and CTR RST reset pulses from the scan counter 400, to be described subsequently. The threshold counter comprises six binary trigger stages 301, 302, 303, 304, 305 and 306. The first five stages 301–305 are reserved for count magnitude (stage 301 being the low order $2^0$ stage) and the final stage 306 is used to indicate sign only.

The logical AND-OR circuitry connecting the six binary stages is that characteristic of a conventional reversible binary counter. An on-off latch 310 controls the counter so that it is operable only during the periods of time in which it is utilized. As will be recalled from the discussion of shift register inspect logic circuit 100, scan segments 27, 28 and 29 are monitored during time periods T6 through T9 for the purpose of generating positive or "count up" counter drive pulses. During time periods T29 through T32 scan segments 2, 3 and 4 are monitored for the purpose of generating negative or "count down" counter drive pulses. Thus, on-off latch 310 is set at T5 by a pulse through OR circuit 311 and is reset at T10 by a pulse through OR 312. When in the set condition, latch 310 turns the counter "on" by enabling the trigger-conditioning AND circuits 307 and 308 associated with each counter stage. At T28 latch 310 is once again set to turn the counter "on" and is reset at T33.

A count up-count down latch 315 controls the direction of counter advancement. At T1 the latch is set to enable the positive inter-stage transfer AND circuits 313 causing the counter to increment in the upward direction in response to each CTR drive pulse applied to input AND circuit 320. At T15 latch 315 is reset to enable, through inverter 316, the negative inter-stage transfer AND circuits 314, causing the counter to be incremented downwardly in response to drive pulses applied to input AND 320. At appropriate times, to be explained subsequently, a CTR RST reset pulse is applied to input line 317 from scan counter 400 to reset all six stages of the threshold counter to zero.

In order to prevent sign stage 306 from being switched for a reason other than a change in sign, inhibit AND circuits 322 and 324 are provided for the purpose of deconditioning input AND 320 when the counter reaches a count of +31 or —31.

Counter magnitude outputs are provided on the THRESHOLD 1 and THRESHOLD 2 output lines from OR circuits 330 and 331. Sign outputs are taken directly from the outputs of the trigger circuit in the final counter stage 306. As shown, when the trigger is in the "1" condition, a negative sign is indicated by a SIGN (—) signal and when the trigger is in the "0" condition, a positive sign is indicated by a SIGN (+) signal, A THRESHOLD 1 output signal is issued from OR 330 whenever the absolute (regardless of sign) magnitude of the count in the counter is equal to or greater than 1. There are three different counter states which define this condition. The first is whenever a minus sign is indicated by sign state 306. This is so because in the counter arrangement employed 0 is considered to be positive, thus the first negative number is —1. A first input is therefore supplied to OR circuit 330 directly from the SIGN (—) output line. The second state indicative of a threshold 1 condition is when sign stage 306 indicates a positive sign and any of the counter stages 302 through 305 is in the "1" state. This condition pertains for all positive numbers greater than 1. A second input to OR 330 is thus provided from an AND circuit 333 which receives inputs from the SIGN (+) output line and from an OR circuit 334. OR 334 is connected to the "1" side of each of the counter stages 302 through 305. The third counter state indicative of a threshold 1 condition is, obviously, when the counter reads +1. The third input to OR 330 is thus supplied from an AND circuit 335 which receives an input from the SIGN (+) output line and from the "1" side of the low order counter stage 301.

A THRESHOLD 2 output, indicative that the absolute magnitude of the counter is equal to or greater than 2, is taken from OR circuit 331. Two counter states define the threshold 2 condition. The first is when the sign of the output is negative and any of the stages 301 through 305 is in the "0" state. This condition prevails for all numbers more negative than —1. The first input to OR 331 is therefore supplied from an AND circuit 336 which receives inputs from the SIGN (—) output line and from an OR circuit 338. OR 338 is connected to the "0" side of each of the counter stages 301–305. The second state definitive of a threshold 2 condition is when the counter is set to any positive number greater than 1. As described above, AND 333 indicates this condition and therefore the second input to OR 331 is taken from AND 333.

Scan counter

The scan counter circuit 400 is shown in detail in FIG. 10. As previously explained in the general description, the function of the scan counter is to provide selective resetting of the threshold counter, and selective gating of RAISE and LOWER feedback signals from circuit 500, depending on the mode of scanning being performed.

The scan counter is a conventional unidirectional binary counter comprising five bistable trigger stages 401, 402, 403, 404 and 405. Stage 401 is the lower order (2°) stage. Besides providing selective resetting of the threshold counter and gating of feedback signals, the scan counter provides an SC16+ output signal which, as previously described in connection with the shift register inspect logic circuit 100, is used to inhibit CTR input signals to the threshold counter after the fifteenth scan of each character in mode 3 scanning. To gate feedback signals from circuit 500, the scan counter generates an SC7+ output whenever the counter reaches a count of 7.

In mode 0 scanning the MODE 0 signal from scan mode determination logic circuit 200 provides, through OR circuits 419 and 420, a continuous reset signal to the scan counter. No signals therefore appear on output lines SC16+ and SC7+ during mode 0 search scanning. In addition, the RESET CTR output to the threshold counter is continually supplied by the mode 0 input signal through OR's 419 and 421, so the threshold counter is also prevented from advancing during mode 0 scanning.

In mode 1 scanning, the MODE 1 input signal supplied from the circuit 200 partially enables each of the AND circuits 411, 413 and 418. The counter is incremented once at T33 during each timing cycle when the "minimum scan requirement" is not detected by the shift register. In this situation the absence of an MSR signal causes inverter 424 to activate AND 411, thus advancing the counter through OR 414. However, as soon as an MSR signal is generated, AND 411 is deconditioned, preventing advancement of the counter, and AND 413 is activated, resetting the counter through OR 420. The scan counter is thus inhibited while characters are being scanned during mode 1 operation. Also, AND circuit 418 is activated at T34 of each mode 1 scan cycle, causing OR 421 to issue a threshold counter reset pulse on output line 425. The threshold counter 300 is thus reset after each scan during mode 1 scanning.

In mode 2 scanning AND circuit 412 is activated at T33 of each scan cycle, generating a signal which is passed by OR 414 to advance the counter one increment and which is employed to sample, by means of AND 415, the state of an AND circuit 422. AND 422 is connected to the "1" side of each of the three lowest order counter stages 401, 402, and 403 and is therefore activated when the counter reaches the count of 7. Therefore, at T33 of each seventh scan in mode 2 AND 415 is activated to set a latch 416. Setting of latch 416 partially enables AND 417 so that during the next time period, T34, AND 417 issues a pulse which is passed by OR 419 to reset, through OR 420, the scan counter and to cause the issuance, through OR 421, of a threshold counter reset pulse on line 425. Latch 416 is reset during the succeeding time period T35. The output pulse generated by AND 422 is also utilized as the SC7+ output signal. Therefore, during mode 2 scanning, the scan counter operates each seventh scan to reset the threshold counter, to reset itself and to generate an SC7+ output signal which is transmitted to the scan centering logic circuit 500 to cause the issuance therefrom of vertical deflection control feedback signals, as will be subsequently explained.

In mode 3 scanning scan counter advancement is accomplished through activation of an AND circuit 410 which generates a counter drive pulse through OR 414 at T33 of each scan cycle which meets the "minimum character requirement," as manifested by the presence of an MCR signal from the main recognition circuit 30. In mode 3 the counter advances one increment per scan until it reaches a count of 16 whereupon an SC16+ output signal is issued from the "1" side of high order (24) counter stage 405. As will be recalled, this signal is employed by the shift register inspect circuit 100 to inhibit further inputs into the threshold counter. The scan counter continues to advance until the scanner leaves the character it is scanning and begins scanning the blank space thereafter. This causes the MCR input to drop, inhibiting further advance of the scan counter. At approximately this same time, a segmentation signal is received from main recognition circuit 30 which, through OR circuits 419 and 420 resets the scan counter and causes, through OR circuits 419 and 421, the generating of a threshold counter reset pulse on output line 425. The scan counter does not resume counting until the scanner comes to the next character, when a new MCR input signal re-enables input AND circuit 410. It is noted that an SC7+ signal is generated each time the scan counter reaches a count of 7 during mode 3 operation as well as during mode 2 operation, but, as will be apparent from the following description of the scan centering logic circuit 500, during mode 3 this signal is inhibited by a MODE 3 input to circuit 500. Further, the output of AND 422 has no effect on the remaining portions of the scan counter circuit during mode 3 since AND 415 cannot be enabled by AND 412.

Scan centering logic circuit

Scan centering logic circuit 500 is shown in detail in FIG. 11. The scan centering logic circuit performs the logical functions of the various AND, OR, and invert logic blocks previously shown and described in the general description in connection with FIGS. 4*a*, 4*b*, and 4*c*. The circuit 500 receives inputs from all four of the previously described registration circuits 100, 200, 300 and 400 as well as from the main recognition circuit 30 to generate LOWER and RAISE feedback signals which are transmitted to the vertical deflection control circuit associated with the scanner.

LOWER and RAISE output signals are supplied by a lower latch 501 and a raise latch 502, respectively. Latch 501 is set in accordance with the previously discussed logical rules by signals from an OR circuit 524. OR 524 is supplied with inputs from AND circuits 517, 518, 519 and 512. Latch 502 is set by signals from an OR circuit 526. OR 526 is supplied with inputs from AND circuits 521, 522, 523 and 513. RAISE and LOWER signals are transmitted through sampling AND gates 503 and 504 which are enabled by a single-shot multivibrator circuit 507. Single-shot 507 is triggered at T37 during any timing cycle and which either of the latches 501 and 502 have been set. This is done by means of an AND circuit 506 which is conditioned, through an OR circuit 505, from the set side of the latches 501 and 502. AND 506 is activated by timing pulse T37 to trigger single-shot 507 to gate an output from either AND 503 or AND 504, depending on which of the latches 501 and 502 are set. The output from AND 506 also sets a reset latch 508 to enable an AND circuit 520. At T39 AND 520 generates a signal through an OR circuit 525 to reset both latches 501 and 502.

At T1 of the ensuing timing cycle reset latch 508 is reset, deconditioning AND 520. At this point it is noted that latches 501 and 502 are also reset through an inverter 509 and OR 525 in the event the DOC INFO FLD signal from recognition circuit 30 ceases.

In mode 0 scanning, no feedback signals are generated by the scan centering logic circuit since none of the AND circuits 517, 518, 519, 512, 521, 522, 523 or 513 can be activated to supply set signals to the latches 501 and 502.

In mode 1 scanning, the MODE 1 input signal partially conditions AND circuits 515 and 516. If at the completion of the scan at T33, the absolute magnitude of the count in the counter equals or exceeds 1 a THRESHOLD 1 input signal, coupled with timing pulse T33, activates AND 515 to partially condition AND 518. If the sign of the count in the threshold counter is positive, input signal SIGN (+) activates AND 518 to set latch 501. This instigates generation of a LOWER feedback signal from AND 503 at T37 in conformance with the first part of aforementioned rule 1 for generation of feedback signals in mode 1.

If a threshold 1 condition has not been achieved but if minimum scan requirements have been met, causing an MSR signal to be generated by the circuit 100, AND 516 is activated to partially condition AND 519. In the event no TOP input is present, indicating that the top and center conditions have not yet been detected during mode 1 by the circuit 100, the output from an inverter 510 activates AND 519 to set latch 501. This causes generation of a LOWER feedback signal in conformance with the second half of the aforementioned rule 1.

During mode 1 scanning RAISE output signals are generated by the scan centering logic circuit in accordance with aforementioned rule 2 as follows. Satisfaction of both the top and center conditions causes a TOP signal to be generated by the circuit 100 and applied to ANDs 522 and 523. If at the end of a scan at T33 a threshold 1 condition is detected in the threshold counter, AND 515 is activated, as mentioned previously, and partially conditions AND 522. If the sign of the count is negative, AND 522 is activated to set latch 502, causing generation of a RAISE feedback signal from AND 504 in accordance with the first part of rule 2. In the event a threshold 1 condition is not detected but the minimum scan requirement has been met, causing circuit 100 to issue an MSR signal, AND 516 is activated to partially condition AND 523. If the top and center conditions have been satisfied a TOP input signal is present to further condition AND 523 and if the bottom condition has not been satisfied the lack of a BOTTOM signal causes inverter 511 to activate AND 523 to set latch 502. This causes generation of a RAISE feedback signal from AND 504 in accordance with the second part of rule 2.

In mode 2 scanning, a LOWER feedback signal is generated by activation of AND 517 to set latch 501. AND 517 is conditioned by a SIGN (+) signal and by a signal from AND 514. AND 514 is activated at T33 by THRESHOLD 2, SC7+ and MODE 2 signals. AND 517 is thus activated in accordance with the aforementioned rule 1 governing generation of LOWER feedback signals in mode 2 operation. RAISE feedback signals are generated in mode 2 scanning by activation of AND circuit 521. AND 521 is activated by a SIGN (−) input signal and by activation of AND 514. Since AND 514 requires THRESHOLD 2, SC7+ and MODE 2 signals for its operation, RAISE feedback signals are generated in conformance with rule 2 governing mode 2 operation. Since both RAISE and LOWER signals require presence of an SC7+ signal, it is seen that feedback is generated only at the required seven scan intervals.

In mode 3 scanning, AND circuits 512 and 513 activate latches 501 and 502, respectively, through the OR circuits 524 and 526 to produce the feedback signals. AND 512 is activated by SIGN (+), THRESHOLD 2 and SEGMENTATION input signals. Latch 501 is thus set during mode 3 scanning when, as the scanner scans between characters, the threshold counter stands in a positive threshold 2 condition. A RAISE feedback signal is initiated when AND 513 is activated by the occurrence of a negative 2 condition in the threshold counter by segmentation.

Vertical deflection control circuit

The vertical deflection control circuit 20 is shown in detail in FIG. 12. A plurality of current sources 96, 97 and 98 are selectively controlled to charge or discharge the capacitor 99 of integrating amplifier 95 to adjust the voltage level at the output thereof. This level is transmitted to a first input of a summing amplifier 85 which generates a voltage level at its output which is used to control the vertical position of the scanning beam of the cathode ray tube 17. Sources 96 and 97 are controlled by LOWER and RAISE signals from registration circuit 50 to accomplish adjustment of the vertical field of scan in the manner hereinafter described. Sources 98 are controlled by signals from the primary beam control circuit 30 to perform the adjustments in the vertical position of the scanning beam required to accomplish end of line shifting, initial beam positioning, etc. A circuit 83 is provided to supply a sawtooth waveform to the second input of summing amplifier 85. This sawtooth establishes the scanning raster used for line searching and scanning.

Operation of the vertical deflection control circuit is as follows. Assuming, first, no change in the level supplied by integrating amplifier 95 to the first input of summing amplifier 85, the circuit 83 generates a vertical raster of constant vertical height which maintains a constant horizontal position. At T1 latch 90 is set, turning off transistor 89. This turns off transistor 88, permitting capacitor 84 to charge through resistor R and transistor 87. This voltage change is amplified by emitter follower 86 and appears as a voltage ramp at the output of summing amplifier 85. At T33 the vertical scan is terminated when latch 90 is reset to turn transistor 89 on. This turns transistor 88 on, thus providing a discharge path for capacitor 84. As capacitor 84 discharges the level at the output of amplifier 85 drops. Since during this time there is no change in the level at the output of amplifier 95, the output at amplifier 85 drops back to its previous level so that the next vertical scan begins from the same relative horizontal position as the first scan.

To adjust the vertical position of the field of scan for scan centering purposes, the output of amplifier 95 is altered during the period from T33 to T1, thus causing the level at the output of summing amplifier 85 to decrease during discharge of capacitor 84 to a level different from the level at which it began the preceding scan. To illustrate this operation additional reference may be had to FIGS. 13*a* and 13*b*. Initially, the output of amplifier 95 is at a level sufficient to establish the output of summing amplifier 85 at a level L (FIG. 13*a*) which in turn establishes the scanning beam at starting point P (FIG. 13*b*). At T1 latch 90 is set, causing capacitor 84 to begin charging, driving the scanning beam through a first vertical scan a (FIG. 13*b*) which is terminated at T33 when latch 90 reset. Capacitor 84 then begins to discharge and the output of amplifier 85 begins to drop toward its previous level. However, at T37 a LOWER input pulse (FIG. 13*a*) is received from circuit 50 at the base of current source transistor 96, causing it to switch to a non-conducting state. This drops its emitter voltage to a level sufficient to forward bias diode $D_1$ causing capacitor 99 to begin to discharge, lowering the output level of amplifier 95. This negative-going transition applied to the first input of amplifier 85 increases the rate at which the output thereof is dropping as illustrated at X of FIG. 13*a*. This enhanced rate of decrease causes the output of amplifier 85 to progress to the level $L_1$, lower than the starting level L. As shown in FIG. 13*b*, this results in a lower starting point for scan *b*.

At T1 of the next timing cycle, the LOWER signal has terminated and latch 90 is once again set, causing a second voltage ramp to appear at the output of amplifier 85 to drive the beam through scan *b* (FIG. 13*b*). At T33 of the second timing cycle, latch 90 is again reset to terminate scan *b* and cause the output of amplifier 85 to begin dropping toward its previous level $L_1$. However, at T37 of the second cycle a RAISE input signal (FIG. 13*a*) is received at the base of current source transistor 97, switching it to a non-conducting state whereby the diode $D_2$ becomes forward biased to pass charging current to the capacitor 99. This raises the voltage level at the output of amplifier 95 and attenuates the negative voltage transition occurring at the output of amplifier 85. This is illustrated at Y of FIG. 13*a*. As a result of this attenuation, the level at the output of amplifier 85 terminates at a level $L_2$ which is higher than the previous level $L_1$ and the same as the level L. The third scan *c* (FIG. 13*b*) thus initiates from the same level as the first scan *a*.

It is noted that the difference between the levels L and $L_1$ is sufficient to readjust the position of the vertical field of scan by one scan segment.

OPERATION

Utilizing the example graphically depicted in FIG. 3, and referring to the circuit schematics just described, the operation of the total registration circuit 50 is hereinafter described.

Initially, the primary beam control circuits position the scanning beam at point S1 (FIG. 3) and scanning begins in mode 0, searching for the first character in the line. Mode 0 control is established by a MODE 0 output from the circuit 200 (FIG. 8) inasmuch as the only input signal to the recognition logic at this time is a DOC INFO FLD signal from circuit 30, causing AND 207 to be activated. This same situation prevails during the first three scans since no black scan segments are detected.

During scan S4 the video data from the scanner indicates black in the four segments 26, 27, 28 and 29. This sets latch 104 in the shift register inspect logic circuit (FIG. 7) generating an MSR output signal and further causes threshold counter CTR drive pulses to issue from AND circuit 145 during each of the time intervals T6, T7, T8 and T9. These pulses drive the threshold counter (FIG. 9) to a count of +4 generating THRESHOLD 1 and SIGN (+) output signals. The MSR signal from circuit 100 is fed to the scan mode determination circuit 200 (FIG. 8) wherein it combines with timing pulse T33 to activate AND circuit 208, setting latch 201 to terminate the MODE 0 output and to initiate a MODE 1 output. This latter signal is transmitted to the horizontal deflection control circuits to decrease the amount of horizontal displacement between scans as is required for mode 1 scanning. The MODE 1, THRESHOLD 1, SIGN (+) and MSR signals are transmitted to the scan centering circuit 500 (FIG. 11) where they combine to activate AND circuits 515 and 516 which in turn activate AND circuits 518 and 519, setting lower latch 501. This causes a LOWER feedback signal to be gated from AND 803 at T37 between scans S4 and S5, whereby scan S5 begins one segment lower than scan S4 (FIG. 3).

During scans S5, S6, S7 and S8 black is detected in segments 25, 26, 27 and 28 (scan S5), 25, 26, 27, 28, 29, 30, 31 and 32 (scan S6, 24, 25, 26, 27, 28, 29, 30, 31 and 32 (scan S7), and 25, 31 and 32 (scan S8), respectively.

Detection of these various video black pulses causes a LOWER feedback signal to be generated from the registration circuit after each of these scans, each feedback signal causing the ensuing scan to begin one segment lower. It is to be noted that during scan S7 the detection of black in the segments 24 and 25 causes bottom latch 112 (FIG. 7) to be set, generating a BOTTOM signal which is transmitted to circuits 200 and 500. This signal, however, does not change the mode of scanning since AND circuit 210 (FIG. 8) lacks a TOP input as well as an input from AND 212.

During scan S9 no black data segments are detected. Therefore, an MSR signal is not generated in circuit 100, preventing generation of either a LOWER or a RAISE feedback signal. The vertical position of the vertical field of scan therefore remains the same from scan S9 through scan S17.

During scan S17 black is detected in segments 31 and 32 thus causing generation of an MSR signal from the circuit 100. This signal causes activation of AND 516 (FIG. 11) of circuit 500 at T33 and because the top condition has not yet been satisfied, enables activation of AND 519 to generate a LOWER feedback signal at T37. The vertical position of scan S18 is therefore lowered one segment. As shown in the diagram of FIG. 3, adequate black segments are included in each of the scans S19 through S27 to continue the trend of lowering the vertical field of scan. However, during scans S28 through S31 no black segments are detected, and therefore, since no MSR signals are generated, the vertical position of the field of scan does not change. During scan S32 the segments 12, 13 and 14 and 30, 31 and 32 are detected to be black. The signals thus detected in segments 12 and 13 cause center latch 116 of circuit 100 (FIG. 7) to be set. However, no TOP signal is generated since AND 106 fails to receive the necessary inputs from positions 2 and 3 of the shift register. Scanning thus continues in mode 1 and the field of scan continues to be lowered one segment per scan.

During scan S38 black is detected in segments 7 through 27 and therefore since this includes both segments 7 and 8, the top condition is met. Latch 108 of the shift register inspect circuit 100 (FIG. 7) therefore is set and a TOP signal issues. This signal is received by the circuits 200 and 500. In the circuit 200 (FIG. 8) AND circuit 210 is fully conditioned except for an input from AND 212. This input is not present since at the completion of scan 38 the threshold counter stands with a +2 count and therefore the THRESHOLD 1 signal prevents activation of AND 212 through inverter 211. In circuit 500 (FIG. 11) the presence of the TOP signal deconditions AND 519 and thus AND 518 alone is activated at T33 to transmit a LOWER feedback signal.

During the following scan, segments 23 through 27 are detected to be black, therefore causing generation of a THRESHOLD 1 signal and once again preventing activation of AND 210 of circuit 200 (FIG. 8). AND circuits 515 and 518 of the circuit 500 (FIG. 11) once again are activated generating a LOWER feedback signal.

During the following scan S40 scan segments 22 through 25 are detected to be black and therefore no THRESHOLD 1 signal issues from the circuit 300. AND 210 is therefore fully conditioned at T33 (FIG. 8) and sets latch 203, terminating the MODE 1 output and initiating a MODE 2 output. This latter signal is transmitted to the horizontal deflection control circuits and causes the displacement between scans to be increased to four times the displacement employed in mode 1 scanning, as shown in FIG. 3. Termination of the MODE 1 signal causes AND circuits 515 and 516 (FIG. 11) to be deconditioned and the MODE 2 signal partially conditions AND circuit 514. Thus AND's 514 and 521 are the gating circuits employed in accordance with the previously stated logical rules for mode 2 scanning to initiate RAISE and LOWER feedback pulses during mode 2 scanning. The MODE 2 signal is also transmitted to shift register inspect circuit 100 (FIG. 7) where it partially conditions AND circuit 145 through OR circuit 143, permitting threshold counter operation to continue. The MODE 2 signal is also received by the scan counter (FIG. 10) where it causes AND 412 to be activated at T33 of each timing cycle to advance the scan counter one increment. This further enables AND 415 to be activated at seven scan intervals to set latch 416 to reset the scan counter and to generate a threshold counter resetting pulse.

As shown in FIG. 3, mode 2 scanning continues to the right without change in the vertical field of scan since no character data is detected. When a pre-printed right-hand margin stripe 47 is detected, a CHAR REC SCAN signal issues from main recognition circuit 30 and is received by the circuit 200 (FIG. 8). This signal permits AND 213 to be activated at T33, setting latch 205, which resets latch 203. This terminates the MODE 2 output signal and initiates a MODE 3 output signal causing horizontal scan displacement to reverse in direction and to decrease in magnitude. The latter signal is received by the scan counter (FIG. 10), enabling counter advancement to be accomplished through activation of AND 410 beginning with detection of the first character (MCR signal). As previously explained, SEGMENTATION signals are periodically received from the circuit 30, denoting when the scanner is scanning between characters. This signal is transmitted to the circuits 400 and 500 where, in the former, it causes the scan counter to be reset and generates a threshold counter resetting output signal. Also, lack of a MODE 2 signal prevents activation of AND circuits 412 and 415 and therefore permits the scan counter to advance to a number equal to the number of scans in each character. As has been explained, after the first fifteen scans an SC16+ output signal issues to the circuit 100 (FIG. 7) where it deactivates AND 139 and AND 145, preventing further inputs to the threshold counter. As characters are rescanned, RAISE and LOWER feedback signals are initiated through activation of AND's 512 and 513 (FIG. 11) in conformance with the previously stated logical rules.

After the line has been scanned for character recognition, the beam continues to the left until the left edge of the document or a pre-printed left margin line is detected. In detecting this left reference point the beam leaves the document information field so that the DOC INFO FLD signal from circuit 30 terminates. This resets mode 3 latch 205 (FIG. 8) through inverter 214, terminating the MODE 3 output signal and causing the lower three inputs to AND 207 to be energized. Thus as soon as the primary beam control re-inserts the beam into the document information field to begin a search for the next line, the DOC INFO FLD signal activates AND 207 to generate a MODE 0 output. This causes the scan centering cycle to repeat itself on the next line of characters.

While the invention has been particularly shown and described with reference to a preferred embodiment thereof, it will be understood by those skilled in the art that various changes in form and details may be made therein without departing from the spirit and scope of the invention.

What is claimed is:

1. On a character scanning device wherein a scanner performs successive vertical scans of characters to generate vertical scan data, the combination comprising:

means for comparing the amount of said scan data generated during an upper portion of one of said scans with the amount of said data generated during a lower portion of the same scan, said comparison means including weighting means for assigning different values, for the purpose of determining said comparison, to data located in different segments of each said upper and lower portions of said scan; and means responsive to said comparison means for adjusting the field of said scanner.

2. The character scanning device of claim 1 wherein said upper and lower portions of said scan are equally spaced on opposite sides of a predetermined point near the center of said scan.

3. The character scanning device of claim 2 wherein said weighting means is constructed and arranged to assign a greater value, for the purpose of determining said comparison, to data detected to lie nearest said center point in each said upper and lower portions of said scan than the value which said weighting means assigns to data detected to lie away from said center point in each said upper and lower portions of said scan.

4. The character scanning device of claim 1 wherein said comparison means further comprises:

threshold means generating an output when the results of said comparison indicate a difference between said amounts of data which is at least as great as a predetermined magnitude, said scanner adjusting means being responsive to said threshold means.

5. In a character scanning device wherein a scanner performs successive vertical scans of characters to generate vertical scan data, the combination comprising:

difference means for determining the difference between the total amount of said vertical scan data generated during upper portions of a plurality of said scans and the total amount of said data generated during lower portions of the same scan and for generating an output representative of said difference, said difference means including weighting means for assigning different values, for the purpose of determining said difference, to data located in different segments of said upper and lower portions of said scan; and means for adjusting the field of said scanner in accordance with the magnitude represented by said output.

6. The character scanning device of claim 5 wherein said upper and lower portions of each said scan are equally spaced on opposite sides of a predetermined point near the center of said scan.

7. The character scanning device of claim 6 wherein said weighting means is constructed and arranged to assign a greater value to data detected to lie nearest said center point in each said upper and lower portions of a scan than the value which said weighting means assigns to data detected to lie away from said center point in said upper and lower portions of said scan.

8. The character scanning device of claim 5 further comprising:

threshold means responsive to said output for generating a second output when the magnitude of said difference is at least as great as a predetermined magnitude, said scanner adjusting means being responsive to said second output.

9. The character scanning device of claim 5 further comprising:

means for rendering said scanner field adjusting means operative only when said scanner is scanning between characters.

10. In a character scanning device wherein a scanner performs successive vertical scan of characters to generate binary vertical scan data, each said scan requiring substantially the same amount of time and being divided into a plurality of time periods, one bit of said binary scan data being generated each said time period, the combination comprising:

serial storage means for storing said vertical scan data in the order in which it is generated;

counting means for determining the difference between the amounts of said scan data entered into said storage means during a first and a second interval during one of said scans; and means for adjusting the field of said scanner in accordance with said difference.

11. The character scanning device of claim 10 wherein said serial storage means comprises a shift register.

12. The character scanning device of claim 11 wherein said counting means comprises a counter constructed and arranged to positively count data bits of a given value entered into said shift register during said first interval and to negatively count data bits of said given value entered into said shift register during said second interval, the condition of said counter at the completion of said second interval representing said difference.

13. The character scanning device of claim 13 wherein said counter is constructed and arranged to increment twice in said positive direction in response to a data bit of a given value entered into said shift register during a predetermined time period within said first interval and to increment twice in said negative direction in response to a data bit of a given value entered into said shift register during a predetermined time period within said second interval.

14. The character scanning device of claim 12 wherein said counter is constructed and arranged to increment twice in said positive direction in response to a data bit of a given value entered into said shift register during the last occurring time period within said first interval and to increment twice in the negative direction in response to a data bit of a given value entered into said shift register during the first occurring time period within said second interval.

15. The character scanning device of claim 10 further comprising:

threshold means linking said counting means and said means for adjusting said scanner, said threshold means permitting operation of said scanner adjusting means only when said difference exceeds a predetermined magnitude.

16. In a character scanning device wherein a scanner performs successive vertical scans of characters to generate binary vertical scan data, each said scan requiring substantially the same amount of time and being divided into a plurality of time periods, one bit of said binary scan data being generated each said time period, the combination, comprising:

serial storage means for storing said vertical scan data in the order in which it is generated;

counting means for determining the difference between the total amount of said scan data entered into said storage means during a plurality of first intervals occurring, one each, in a plurality of scans and the total amount of said scan data entered into said storage means during a plurality of second intervals occurring, one each, in said plurality of scans; and means for adjusting the field of said scanner in accordance with said difference.

17. The scanning device of claim 16 wherein said serial storage means comprises a shift register and wherein said means for adjusting said scanner further comprises:

means for adjusting the field of said scanner in a first direction when the absolute magnitude of said difference exceeds a predetermined value and said difference has a first sign; and means for adjusting the field of said scanner in a second direction when the absolute magnitude of said difference exceeds said predetermined value and said difference has a second sign.

18. The scanner of claim 17 wherein said counting means comprises a counter constructed and arranged to increment once in a first direction in response to a data bit of a given value entered into said shift register during the first occurring time period within said first interval and to increment twice in said first direction in response to a data bit of said given value entered into said shift register during the last occurring time period within said first interval;

said counter being further constructed and arranged to increment once in a direction opposite said first direction in response to a data bit of said given value entered into said shift register during the last time period within said second interval and to increment twice in said opposite direction in response to a data bit of said given value entered into said shift register during the first occurring time period within said second interval.

19. In a character scanning device wherein a scanner performs successive vertical scans of characters to generate scan data, the combination comprising:

first logic means responsive to scan data generated during a mid-portion of one of said scans and for producing an output upon detecting a predetermined data pattern;

second logic means responsive to scan data generated during a portion of said scan displaced from said mid-portion and for producing an output upon detecting a predetermined data pattern; and control means connected to said first and second logic means for shifting the field of scan in a first direction, said control means being operable in response to the absence of an output from either said first or said second logic means.

20. The character scanning device of claim 19 wherein said second logic means is responsive to scan data generated during an upper portion of each said scan and wherein said control means shifts the field of said scan downwardly with respect to said characters.

21. The character scanning device of claim 21 further comprising:

storage means for storing the outputs from said first and second logic means and for presenting said outputs to said control means, whereby said control means are effective to shift said field of scan when said outputs from said first and second logic means occur during different scans.

22. The character scanning device of claim 19, further comprising:

second control means connected to said first and second logic means for shifting the field of scan in a direction opposite said first direction, said second control means requiring for its operation the presence of outputs from both said first and said second logic means.

23. The character scanning device of claim 22 wherein said second logic means is responsive to scan data generated during an upper portion of each said scan and wherein said first control means shifts the field of scan downwardly with respect to said characters.

24. The character scanning device of claim 22 further comprising:

storage means for storing the outputs from said first and second logic means and for presenting said outputs to said first and second control means, whereby said first and second control means are effective to shift said field of scan when said outputs from said first and second logic means occur during different scans.

25. In a character scanning device wherein a scanner performs successive vertical scans of characters to generate scan data, each said scan being horizontally displaced with respect to the previous scan, the combination comprising:

first logic means responsive to scan data generated during an upper portion of one of said scans and for producing an output upon detecting a predetermined data pattern;

second logic means responsive to scan data generated during a mid-portion of said scan and for producing an output upon detecting a predetermined data pattern;

third logic means responsive to scan data generated during a lower portion of said scan and for producing an output upon detecting a predetermined data pattern; and control means connected to said first, second and third logic means for adjusting the magnitude of horizontal displacement between successive vertical scans, said control means requiring for its operation the presence of outputs from said first, second and third logic means.

26. The character scanning device of claim 25 further comprising:

storage means for storing said outputs from said first, second and third logic means and for presenting said outputs to said control means, whereby said control means is effective to adjust said horizontal displacement when said outputs from said first, second and third logic means occur during different scans.

27. The character scanning device of claim 26 further comprising:

means responsive to the operation of said control means for resetting said storage means.

References Cited

UNITED STATES PATENTS 3,142,761 7/1964 Rabinow -------- 340—146.3 X
3,353,024 11/1967 Stockdale.

DURYL W. COOK, Primary Examiner

340—146.3